(12) United States Patent
Artes et al.

(10) Patent No.: US 9,665,721 B2
(45) Date of Patent: May 30, 2017

(54) THREAT AND DEFENSE EVASION MODELING SYSTEM AND METHOD

(71) Applicant: NSS Labs, Inc., Austin, TX (US)

(72) Inventors: Francisco S. Artes, Austin, TX (US); Stefan Frei, Austin, TX (US)

(73) Assignee: NSS LABS, INC., Austin, TX (US)

( * ) Notice: Subject to any disclaimer, the term of this patent is extended or adjusted under 35 U.S.C. 154(b) by 0 days.

(21) Appl. No.: 14/692,651

(22) Filed: Apr. 21, 2015

(65) Prior Publication Data

US 2015/0310217 A1    Oct. 29, 2015

Related U.S. Application Data

(60) Provisional application No. 61/983,368, filed on Apr. 23, 2014.

(51) Int. Cl.
*H04L 29/06* (2006.01)
*G06F 21/57* (2013.01)

(52) U.S. Cl.
CPC ...... *G06F 21/577* (2013.01); *G06F 2221/034* (2013.01)

(58) Field of Classification Search
CPC .................................................. G06F 21/577
See application file for complete search history.

(56) References Cited

U.S. PATENT DOCUMENTS

| | | | |
|---|---|---|---|
| 8,516,449 B2 | 8/2013 | Artzi et al. | |
| 9,158,915 B1 * | 10/2015 | Yumer | G06F 21/566 |
| 2003/0182230 A1 * | 9/2003 | Pessin | G06Q 20/00 705/39 |
| 2005/0044418 A1 * | 2/2005 | Miliefsky | H04L 63/1433 726/4 |
| 2007/0113281 A1 * | 5/2007 | Leach | G06Q 40/08 726/22 |
| 2007/0192867 A1 * | 8/2007 | Miliefsky | G06F 21/577 726/25 |
| 2012/0317627 A1 | 12/2012 | Chandrashekhar et al. | |
| 2013/0061327 A1 | 3/2013 | Thomas et al. | |
| 2014/0237545 A1 * | 8/2014 | Mylavarapu | H04L 63/1433 726/3 |

FOREIGN PATENT DOCUMENTS

| | | | | |
|---|---|---|---|---|
| TW | 201413488 A | 4/2014 | | |
| WO | WO 2007013527 A1 * | 2/2007 | .......... | G06F 11/0793 |
| WO | WO 2014019815 | 2/2014 | | |

* cited by examiner

*Primary Examiner* — Shawnchoy Rahman
(74) *Attorney, Agent, or Firm* — DLA Piper LLP (US)

(57) ABSTRACT

A system and method for modeling viable threats and for evading deployed defenses on a network are described. As a defensive tool used for threat modeling, the system and method allows those responsible for the safety of their critical infrastructure and intellectual property to have a clear view of all failures in the security countermeasure products they have deployed. As an offensive tool used for defense evasion modeling, the system and method can be used to quickly ascertain a viable attack vector, select exploitation code, and cross-reference those exploits that will bypass every layer of countermeasure technologies to commercially- and publicly-accessible crimeware and security testing tools.

25 Claims, 24 Drawing Sheets

Illustration of Threat Modeling

1.) Pick your Applications and Operating Systems

2.) Choose your Security Products

3.) We tell you which Exploits can get through

4.) We also tell you whether or not those Exploits are in CrimeWare Kits.

FIGURE 4B

- CVE-2010-1297

| Publication | 2010 |
| CVSS | 9.30 |
| Attk Vector | Target-Initiated |
| Description | Adobe Flash Player newfunction Memory Corruption |
| Vendor: Adobe | Adobe-reader Flash-Player Acrobat |
| Undetected by | IBM GX7800 Juniper SRX3600 Norman Avast Trend Micro Avira MSE Panda |
| Crimeware, Testtool | Metasploit BleedingLife MerryChristmas Zero Phoenix |

Figure 12

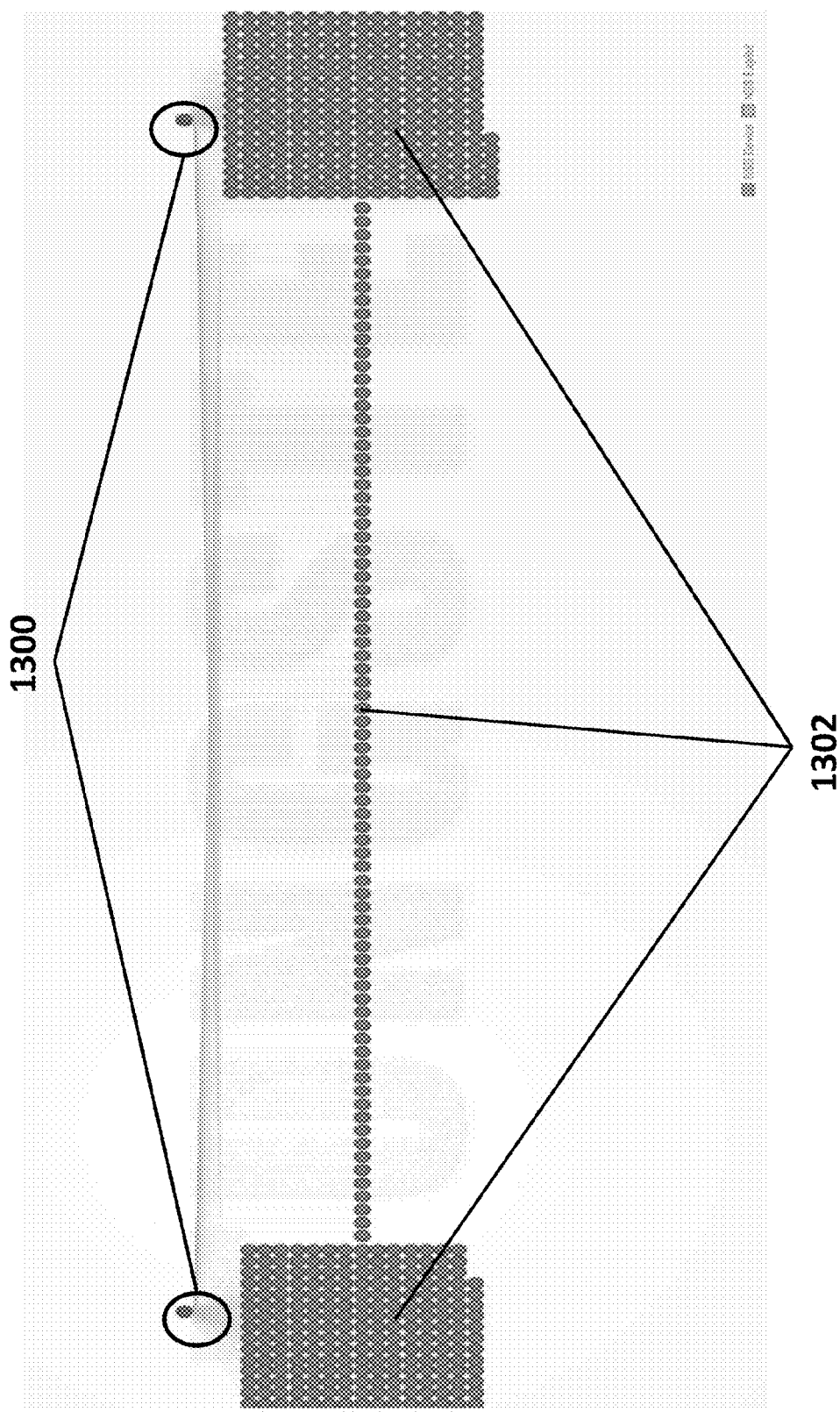

```
def trx_exploit2CWE(m):

TRX = MaltegoTransform();

conn = setupConnection();

exploit = (m.Value,)

cursor = conn.execute('SELECT `cwe`,`expname` FROM `nss-exploit-meta` WHERE expid=?', exploit)

for row in cursor:

cwe = row[0]

cwename = row[1]

if(cwe != "" and cwe != "n/a"):

CWEEnt = TRX.addEntity("nss.CWE",row[0])

CWEEnt.addProperty( "cwename", "CWE Description", "false", "CWE-"+cwe+" "+cwename)

return TRX.returnOutput()
```

FIGURE 21

THREAT AND DEFENSE EVASION MODELING SYSTEM AND METHOD

PRIORITY CLAIM/RELATED APPLICATION

This application claims the benefit of and priority to, under 35 USC 120 and 35 USC 119(e), U.S. Patent Application Ser. No. 61/983,368, filed on Apr. 23, 2014 and entitled "Threat And Defense Evasion Modeling System And Method", the entirety of which is incorporated herein by reference.

FIELD

The disclosure relates to a system and method for modeling or simulating relevant attacks against chained/layered network security and endpoint security technologies.

BACKGROUND

Currently, when trying to assess a computer/network security risk, key stakeholders and decision makers are forced to work with non evidentiary data, often relying on the claims of security product vendors, and therefore cannot articulate the risk(s) to the systems, intellectual property, or critical data they are responsible for protecting. A third party is rarely used to determine the true efficacy of security countermeasure products. Furthermore, consumers lack the technical know-how, or the high-cost equipment and manpower needed to test each security product within their infrastructure. The reality is that the human resources within an IT organization are used to build and maintain infrastructure not to test the security efficacy of that infrastructure, even though they are ultimately responsible for said security efficacy.

In most cases, the consumer of security products is using an old thought model that is based on two mistruths:

First, layered security countermeasures, especially when using disparate vendors, will result in better security because flaws in one product should not be present in the next product, but instead they will cancel each other's flaws. Mathematically this is represented as follows:

$$P_{a*b}=P_a*P_b=X\%$$

Second, by focusing on the most current and widely advertised/scary malware/exploit "in the wild" and addressing technologies that will help prevent this, the overall security is "better." This is akin to snake oil sales.

In addition, current security testing focuses on "attacker-initiated" attacks. These are forceful attacks from the outside of the network, but current testing does not address the more prevalent source of security failures—those being "target-initiated" attacks. Target-initiated attacks are attacks that take place with the innocent assistance of internal employees who fall victim to phishing, malware, and other scam attacks.

Offensively speaking, groups such as the government must rely on old techniques, such as the Cyber Kill Chain™, that are tedious and very slow. This does not provide true operational capability for an effective offensive operation.

BRIEF DESCRIPTION OF THE DRAWINGS

FIG. 4B illustrates an example of the use of the transforms in FIG. 3;

FIG. 12 illustrates an example of a user interface showing details of an exploit;

FIGS. 13A-C illustrates an example of a user interface generated based on a particular transform;

FIG. 21 illustrates an example of pseudocode of an exemplary transform.

DETAILED DESCRIPTION OF ONE OR MORE EMBODIMENTS

The disclosure is particularly applicable to a cloud based threat and defense evasion modeling system and method and it is in this context that the disclosure will be described. It will be appreciated, however, that the system and method has greater utility since it may be implemented on other computer based systems. For purposes of the disclosure, an "exploit" may include an exploit, malware and/or a vulnerability of a security product.

In one embodiment of the system and method, consumers can model their network and endpoint security solutions (both hardware and software based.) The consumers can then review the efficacy (based on prior testing results performed by $3^{rd}$ party and stored in a database.) This allows the consumer to understand which exploits and malware can bypass each layer of their security, as well as (and more importantly) those attack techniques that are capable of bypassing all the layers of their security. This allows the consumer to focus operational and capital efforts and expenditures to better fortify their security by providing a true outline of those risks that need to be mitigated. In this embodiment, the system is being used as a defensive tool.

In the second embodiment of the system and method, consumers can quickly ascertain which new security products would best fit a given security concern. E.g., Answering: Which product best protects any combination of applications and/or operating systems? In this embodiment, the system is being used as a defensive tool.

In a third embodiment of the system and method, those acting in an offensive nature can quickly ascertain those vulnerabilities in any level of a complex infrastructure that are susceptible to specific exploits and malware. This allows them to identify the tools needed to bypass the security, and this can be done in several seconds rather than several months. In this embodiment, the system is being used as an offensive tool.

Figure 1:
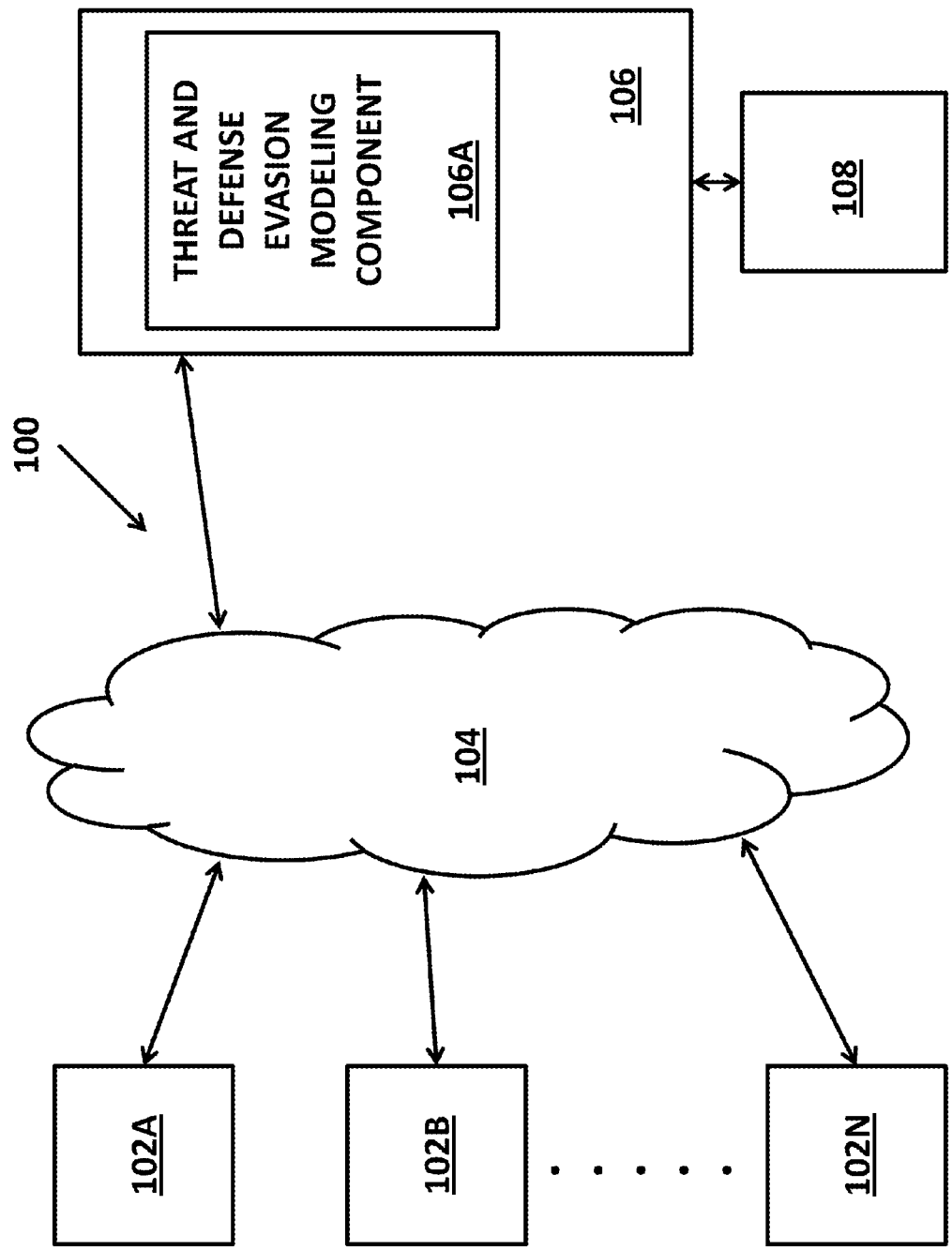
FIG. 1 illustrates a first embodiment of the threat and defense evasion modeling system.

FIG. 1 illustrates a first embodiment of the threat and defense evasion modeling system 100 that may be implemented in a software as a service (SaaS) model in which third parties may access the results of the analysis performed by the system. The system 100 may have one or more networks 102, such as network 102A, 102B, . . . , 102N, that may each be coupled by a communications path 104 to a threat and defense evasion system 106. The threat and defense evasion system 106 may have a store 108 coupled to it to store the threat models and the like and other information of the system. The store 108 may be implemented in software or hardware and may be a persistent storage device, database, relational database and the like.

Each network 102 may be a network having a plurality of computers of an entity and each network 102 may be tested and measured by the threat and defense evasion system 106 as described below in more detail. The communications path 104 may be a public or private network, a wireless or wired network and the like.

The threat and defense evasion system 106 may be implemented using one or more known cloud computing resources or one or more server computers in which the threat and defense evasion system 106 may be implemented using one or more processors, memory, persistent storage devices and the like. The threat and defense evasion system 106 may further comprise a threat and evasion modeling component 106A that performs the modeling of the threats that may be used for defensive purposes or offensive purposes as described below in more detail. In a software implementation of the system 106, the threat and evasion modeling component 106A may be a plurality of lines of computer code that may be stored in the memory of the threat and defense evasion system 106 and then executed by a processor of the threat and defense evasion system 106 so that the processor is configured to perform the functions and operations of the threat and defense evasion system as described below. In a hardware implementation, the threat and evasion modeling component 106A may be a device or functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc.

The threat and evasion modeling component 106A may be used to generate a model for each network and store the one or more model(s) in the store 108. The threat and evasion modeling component 106A may generate one or more user interfaces based on the modeling that has been done. The modeling may be used for defensive purposes or offensive purposes. When used as an offensive tool or defensive tool, the threat and evasion modeling component 106A may provide one or more user interface(s) to a client as described below in more detail. The store 108 may also store (or provide access to) one or more transform databases so that the transforms may be performed by the system.

When the system is being used as a defensive tool, the system may display one or more user interface(s) so that the customer of the system may quickly ascertain which new security products would best fit a given security concern of the customer. Thus, the system may be used to answer the question of "Which product best protects any combination of applications and/or operating systems?" When the system is used as an offensive tool, the system may generate and display one or more user interface(s) that allow the customer to quickly ascertain one or more vulnerabilities in any level of a complex infrastructure that are susceptible to specific exploits and malware. This allows the customer to identify the tools needed to bypass the security, and this can be done in several seconds rather than several months using typical systems. For example, these tools may include "Metasploit," a commercial and enterprise-grade product developed by Rapid? LLC, commercially avalible tools such as Phoenix, Zero, Savapay0C, Eleonore and freeware systems such as BlackHole, Mushroom and Mpack.

Figure 2:
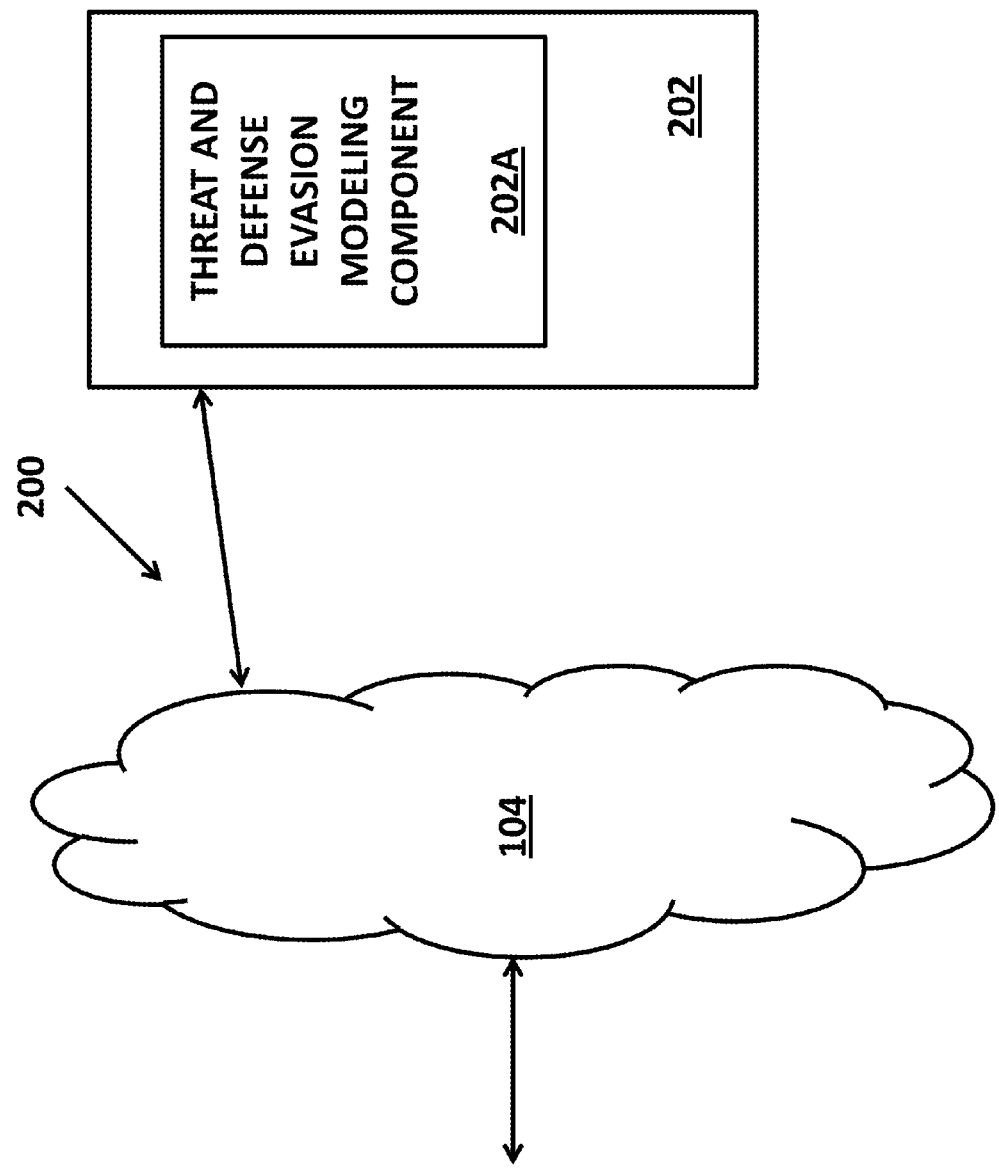
FIG. 2 illustrates a second embodiment of the threat and defense evasion modeling system.

FIG. 2 illustrates a second embodiment of the threat and defense evasion modeling system 200 in which a threat and evasion modeling component 200A (that operates as described above) may be part of/coupled to or embedded in a network 200 of a customer and then the customer may use the threat and evasion modeling component 200A in the same defensive and offensive manners as described above and described in more detail below.

Figure 3:
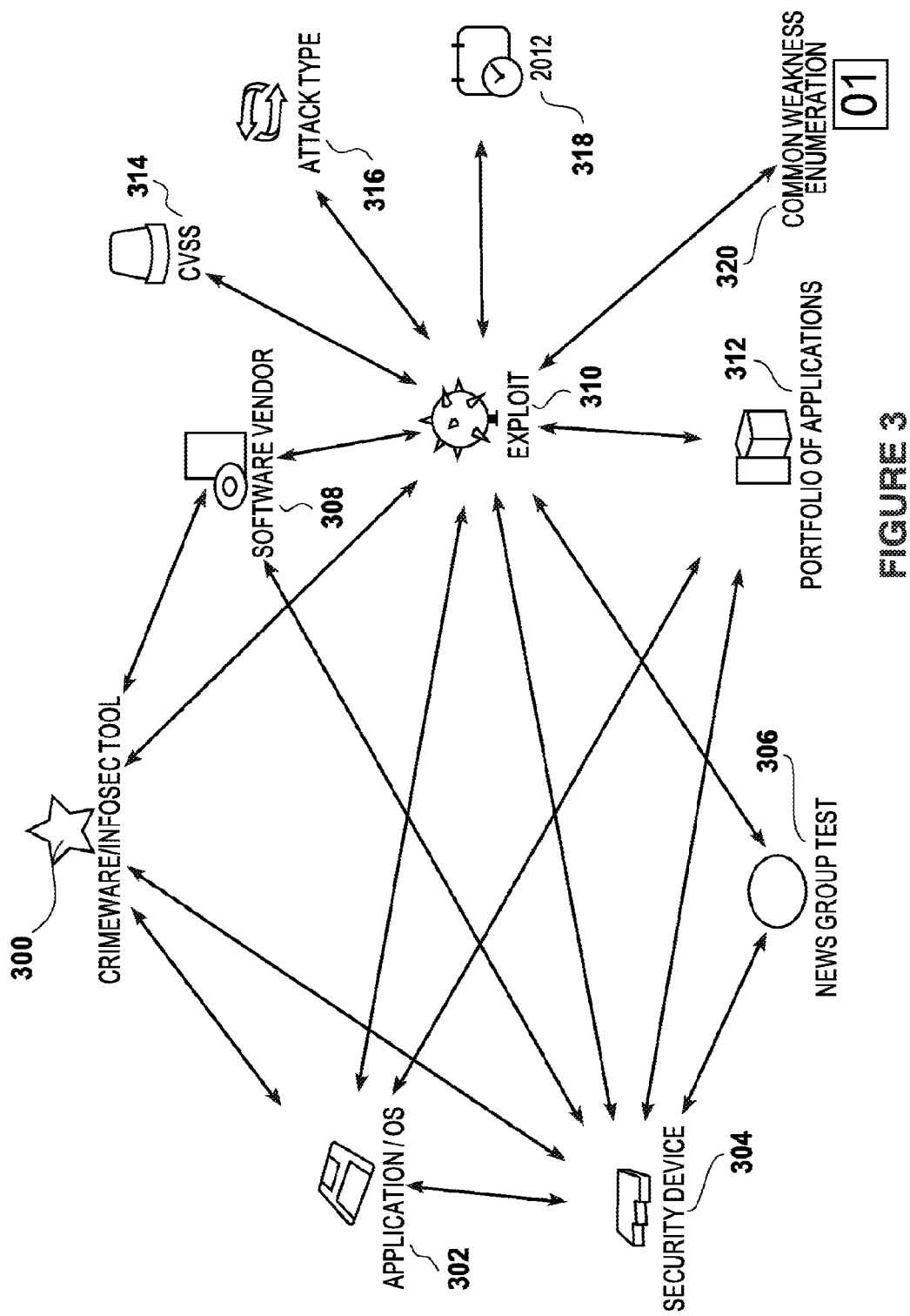
FIG. 3 is a diagram displaying interconnections of the various objects (transforms) that can be conducted using the system shown in FIGS. 1-2.

FIG. 3 is a diagram displaying interconnections of the various objects (transforms) that can be conducted using the system shown in FIGS. 1-2 to model the threats. In the diagram in FIG. 3, each of the links (connections) between the objects/transforms may be bi-directional allowing the system to parse, display, and link data organically. In this diagram, the threat and evasion modeling component appears as the CrimeWare/Infosec Tool 300. The other objects/transforms may include application/OS object 302, security device object 304, NSS Group Test object 306, software vendor object 308, exploit object 310, portfolio of applications object 312, CVSS object 314, attack type object 316, 2012 object 318 and common weakness enumeration object 320.

Figure 13B:
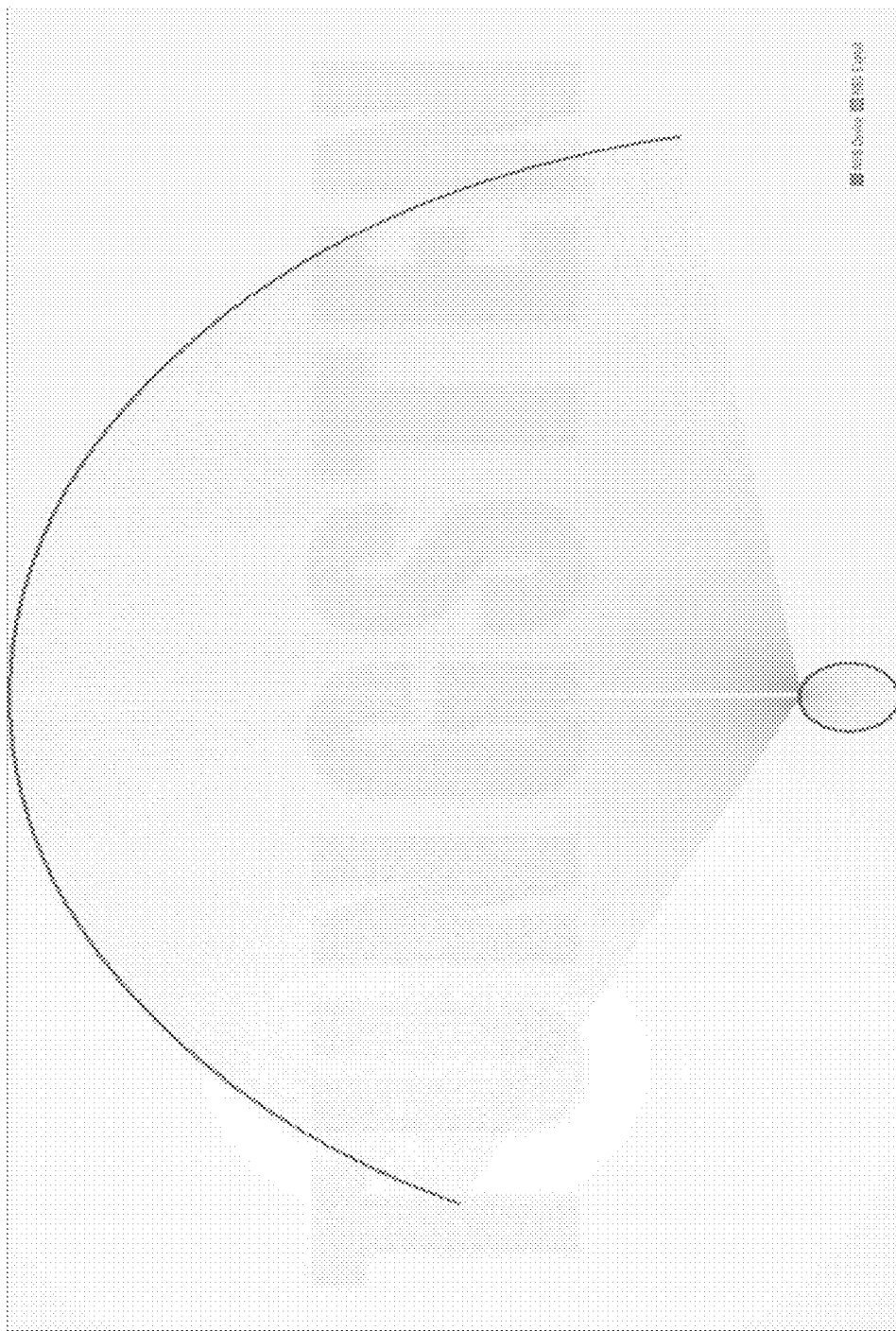
Figure 13C:
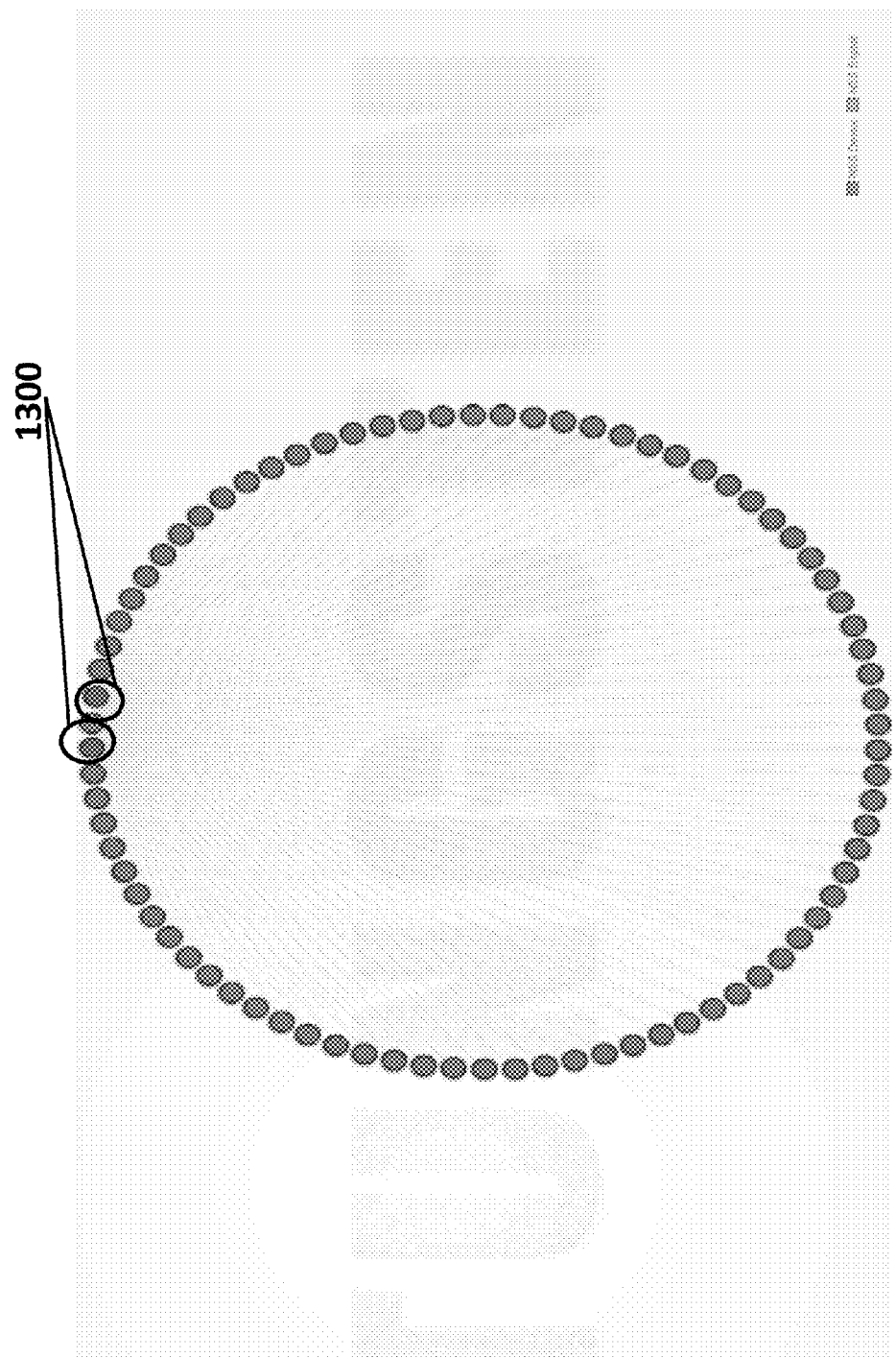

As shown in FIGS. 13A, 13B and 13C, the transforms and user interfaces generated by the an example transform is shown. Each transform may be used to generate correlation and relationship information from disparate databases due to the transform being written in a way to create a key index. For example, a database can be queried to show all entries that fit a data class of "device", then group those "device" entries by "year of test." The device may be a hardware device or a software tool. Having the same "device" names in a third database, the user of the system can then have the tool display all "exploits" that are known to be associated to each specific "device." The resulting image is one that presents all devices tested, in a given year, and show all exploits known to bypass each device. As the database is relational, the "device" objects may share "exploits" they missed. In layering the devices, and knowing what shared exploits bypass them, it is trivial for the end-user to identify which exploits bypass all their devices.

As shown in FIG. 13A, two network security devices 1300 (green dots surrounded by circles) have been modeled and the transform has been run to show the exploits 1302 for each device that are known to bypass the device during testing. The exploits 1300, shown an orange dots, that span in between the two devices are those exploits that are shared/correlated failures between the two devices.

As shown in FIG. 13B, the data from the transforms has been rearranged so the outlying exploits, these being singularities to either but not to both of the devices are easily seen. As shown in FIG. 13C, the two devices 1300, represented by green dots in circles, are lined to each of the exploits, (the other dots in the circle that are orange), and lines are drawn to show the linkage of each exploit to both modeled devices. This shows us that any of these exploits will bypass both of the modeled security devices, even when they are used in series to generate a layered defense. FIG. 21 illustrates an example of pseudocode of an exemplary transform of the data by the system. Through the use of data transforms described above that query databases containing empirical test result data on exploits that bypass security products, the system is able to identify correlating failures within disparate security technologies. Furthermore, the system has been used to prove the correlation in failures are quite prevalent, disproving prior assumptions on layered security, and is expressed mathematically as: $P_{a*b} \neq P_a\, P_b$ But instead: $P_{a*b} \geq P_a\, P_b$. In the system, the discovered data may then be graphically represented providing the illustration of the pathway of identified and correlated attack methodologies and exploitations that are successful against the security countermeasures being modeled. Consumers of this data can use this information to bypass all layers of network and system security, and with the knowledge of how to render the security useless they will successfully infect/take control of a remote system or network of systems. The data can also be used in a defensive manner, allowing the defender(s) to identify these correlated failures so that the failures may now be addressed and mitigated.

While the data being mined by the system takes years to develop, the modeling of all viable attack vectors, to include mapping to commercially/publicly available attack tools, takes only seconds to perform. The system can be used to model both "attacker initiated" and "target initiated" failures within security countermeasure products. An attacker initiated attack is an attack is which the attacker (hacker) works to break into a network or system by actively attacking it. A target Initiated attack is the easier and far more used way to attack a network. In this attack, the attacker tricks people on the network so that the attacker can gain access to the network for launching code (malware) which in turn launches an exploit against their workstations and provides me instant access.

This data is invaluable, and allows both defenders and attackers to understand all potential vectors of attack. The system can also model the exfiltration of data from the network, as well as command and control (C&C) channels that are known to go undetected by the countermeasure technologies that address this portion of the security kill chain.

The modeling performed by the system and user interfaces generated by the system allow a customer to review threats and attacks by beginning with any combination of one or more applications they wish to model. Once the modeling is completed by the system, the customer can quickly assess which current exploits exist that target the combination of one or more applications used by the customer. These exploits can then be cross-referenced to security countermeasures that are known to be susceptible to these exploits, and finally a listing of countermeasures will be compiled indicating their ability or inability to defend the specific application. Thus, the system may generate a complete model of all inbound and outbound security countermeasures can be created with the user interface. Thus, a customer of the system can then identify all the exploits that are known to bypass each countermeasure device.

Figure 4A:
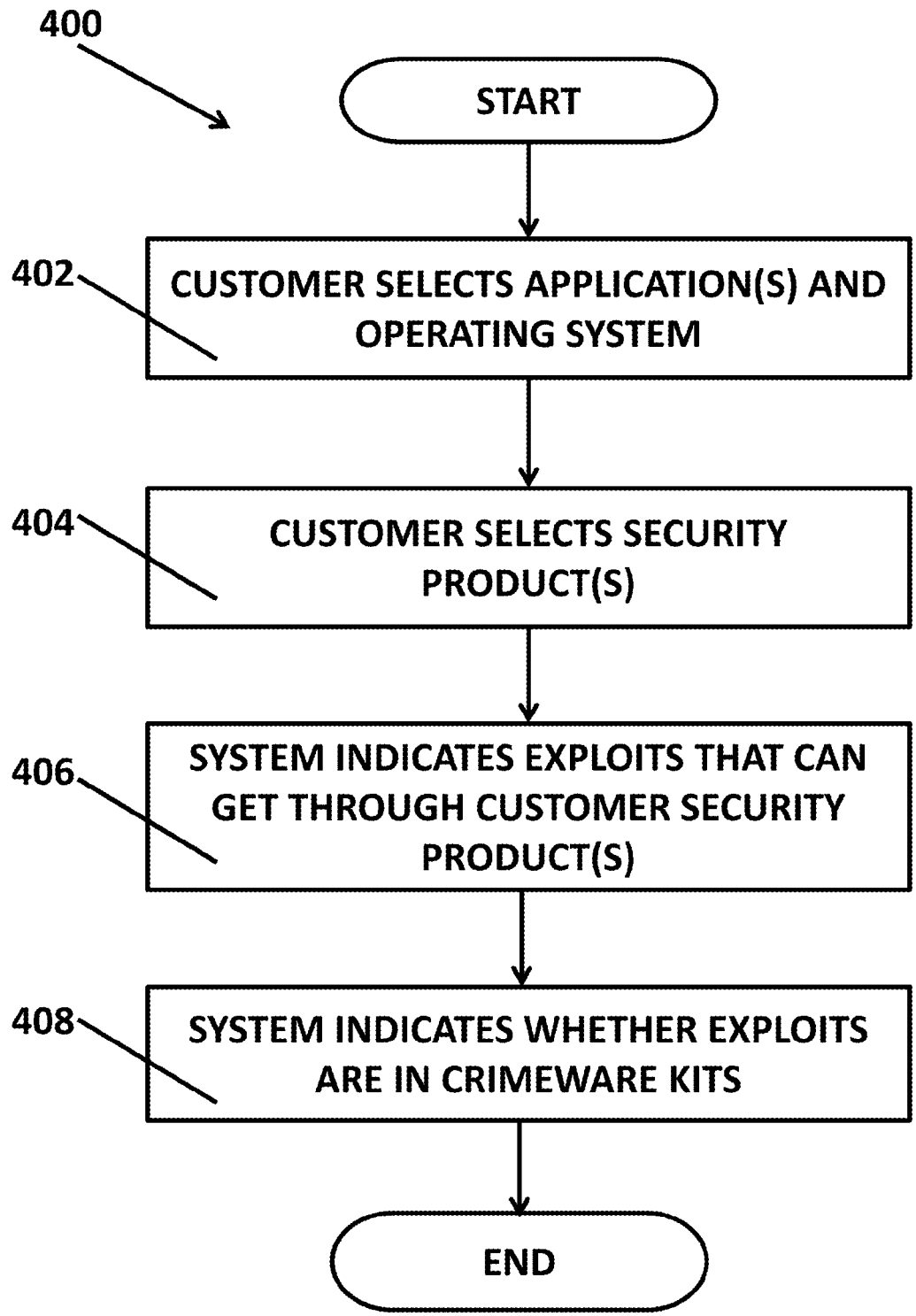
FIG. 4A illustrates a method for threat modeling.

FIG. 4A illustrates a method for threat modeling 400 using the system and FIG. 4B illustrates an example of the use of the transforms in FIG. 3. In these figures the logical flow/selection of transforms has been enumerated to show how a customer using the system may select an entity, such as an application and/or an operating system, they may wish to protect or target for attack so that the system receives this information (402 and process 1 shown in FIG. 4B.) The customer may select the one or more security products they either have on, or wish to add to, their network, or they can model those in place at their current target so that the system receives this information (404 and process 2 in FIG. 4B.) Once the customer has provided that input to the system, the system (based on the generated modeling) may display those exploits/vulnerabilities/malware with the ability to bypass each security product selected (406 and process 3 in FIG. 4B) which target the specific application/operating system they are interested in securing or compromising. The system may generate an indication (based on cross-references between the identified exploits/vulnerabilities/malware to "crimeware" and security testing tools) of whether the identified exploits are in security testing tools (408 and process 4 in FIG. 4B) that already have these attacks fully automated within them. This is important for testing, as well as a means to cloak a true attack by using commonly available attack software (e.g. looking like every other attack against a network.)

Figure 5:
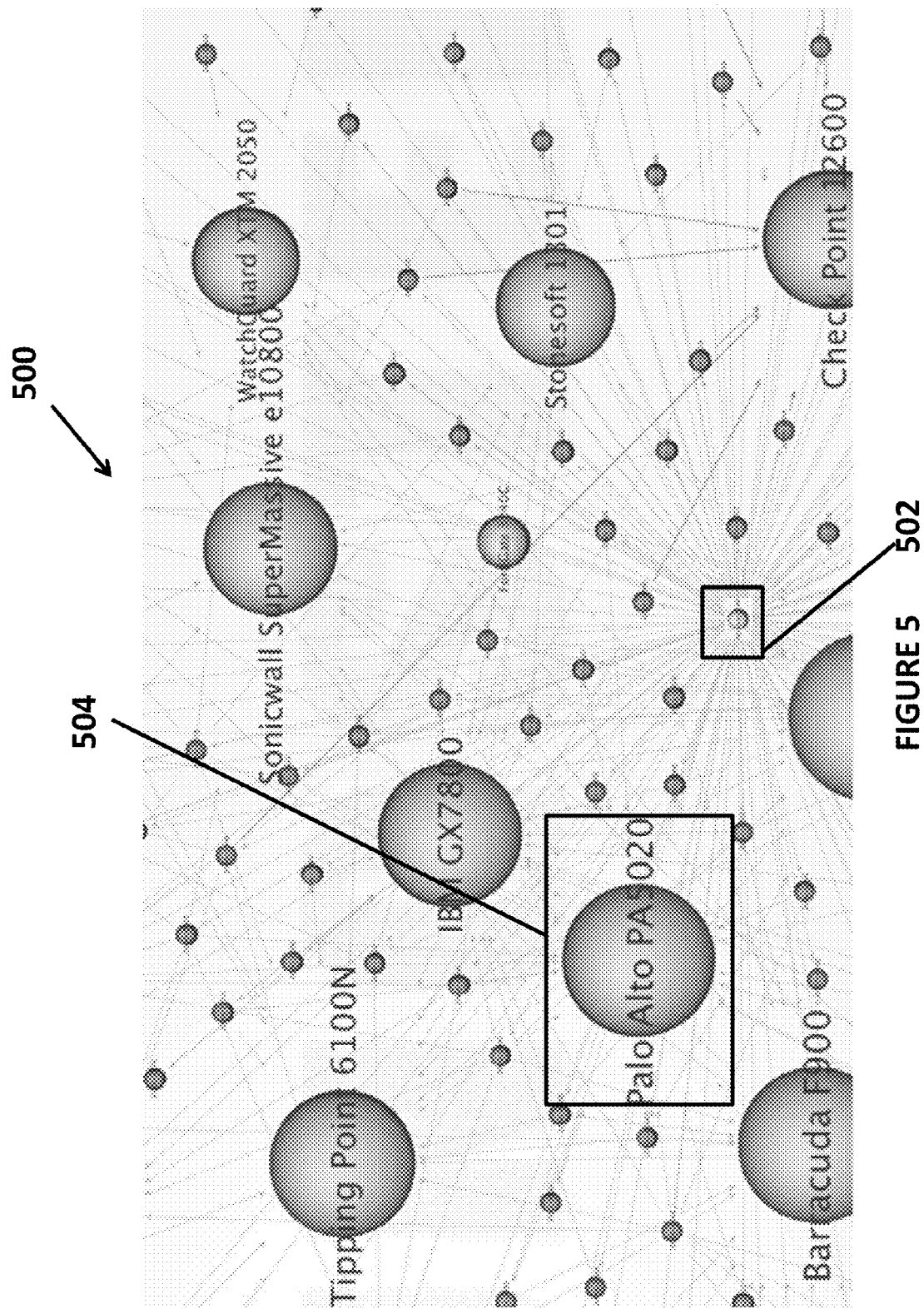
FIG. 5 is a partial screen capture of sample output from a model produced by the system in FIGS. 1-2.

FIG. 5 is a partial screen capture of sample output 500 from a model produced by the system in FIGS. 1-2. Specifically, in the example shown in FIG. 5, the model represents Windows XP as the operating system to be secured 502 (represented by the green sphere in the bottom-center of the figure.) The other smaller circles/spheres with links to the operating system to be secured are the exploits (blue spheres) that are known exploits for Windows XP. These exploits are tracked relative to security products 504 (shown as a number of larger purple spheres) that grow in size as they have more parent-objects (the exploits) connecting to them. Thus, for example, the Palo Alto PA5020 and Tipping Point 6100N security product have a similar number of exploits that link to them (and are on similar size) while the Stonesoft 1301 security product is smaller in size indicating that there are fewer exploits linked to it. Thus, using the user interface in FIG. 5, the customer can see which security products are best for the particular operating system. Thus, as shown in FIG. 5, the smaller purple spheres indicate security products that are better at defending Windows XP. This type of Model thus allows the customer to select a security product based on the exploits selected by the customer. Each exploit is a program that causes some potential harm. For example, one well known exploit is the Heartblead Exploit that is an exploit against OpenSSL that allowed hackers to steal the username and passwords for hundreds of millions of account on Ebay, Amazon, banking sites, etc. last year).

In addition, the system may isolate the exploits that are known to bypass all the modeled countermeasures. From this point, a customer of the system can cross-reference the viable exploits and determine if they are currently automated in commercially/publicly available tools. With the automation of such an exploit, the viability of the attack is greater as the required skill-level of a potential attacker is greatly reduced. An attack can be conducted based on this information within minutes, or a better understanding of which flaws exist within deployed countermeasures can be represented and addressed/mitigated.

Figure 6:
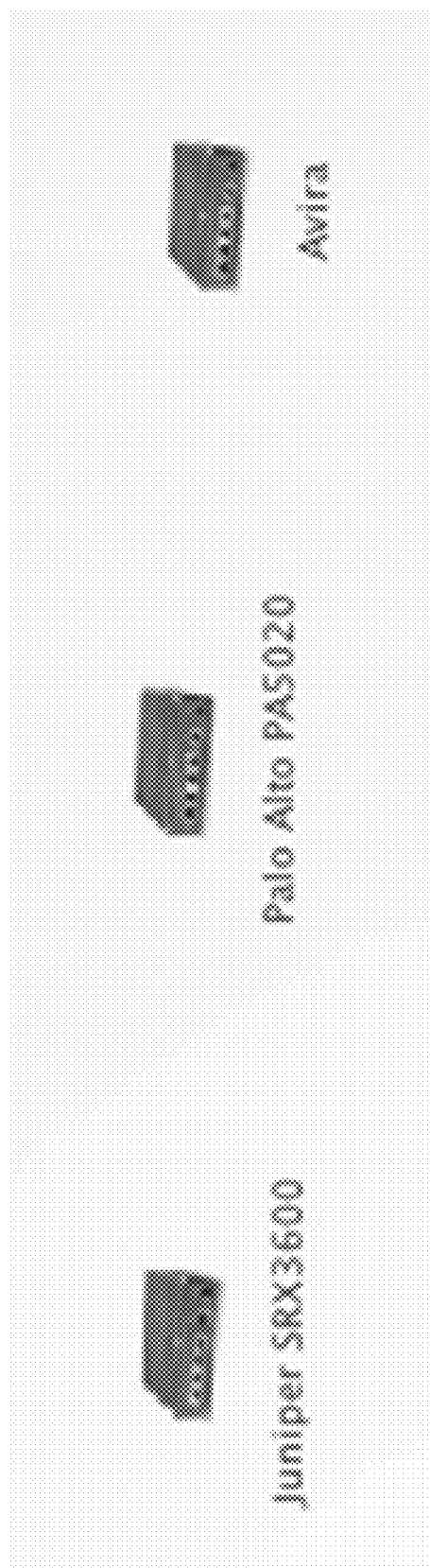
FIG. 6 illustrates three commercial products selected for testing.
Figure 7:
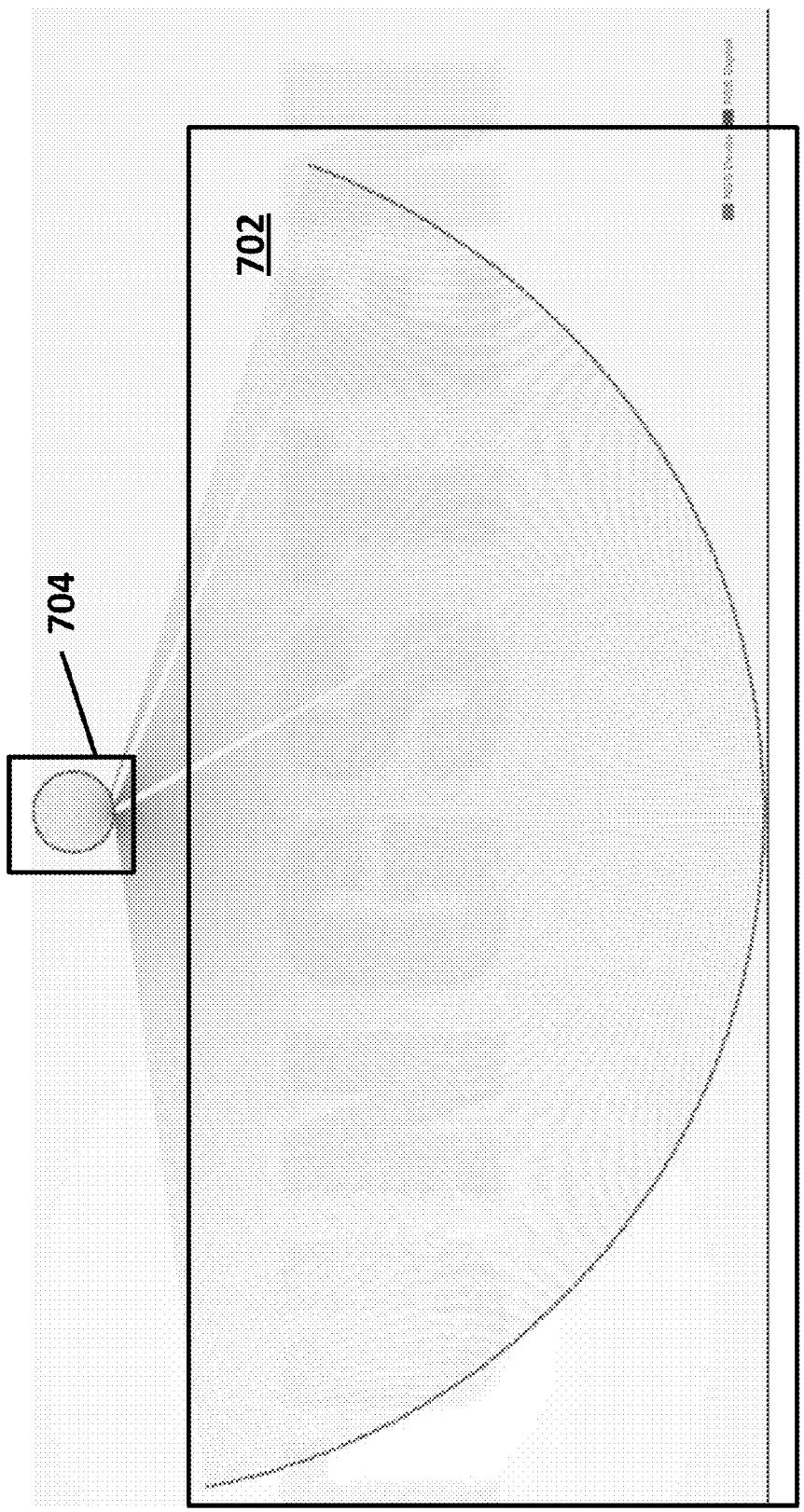
FIG. 7 is an illustration of the exploits identified through empirical testing of the products selected and identified in FIG. 6.

FIG. 6 illustrates three commercial products selected for testing and a second example of the use of the system begins by identifying specific security products as shown in FIG. 6. This use of the system allows a customer to find any exploits/vulnerabilities/malware that can bypass all three of these security countermeasures in the security products that have been selected. In the example in FIG. 6, Juniper's SRX3600 which will be used as an intrusion prevention service (IPS), Palo Alto's PA5020 which will operate as an next generation firewall (NGF), and Avira which is an end-point protection product (EPP) aka anti-virus. FIG. 7 is an illustration of the exploits identified through empirical testing of the products selected and identified in FIG. 6 when the model is activated to display all exploits known to bypass each product individually. As shown in FIG. 7, the spheres within the boxes represent one exploit/vulnerability/malware sample that is known to bypass at least one of the security countermeasures selected. An outer ring 702 of blue spheres (in box 702) represents the outliers, e.g. exploits/vulnerabilities/malware that bypass only one of the selected security countermeasures but are blocked by one of the others. An inner circle 704 of blue spheres (in box 704) represents the exploits/vulnerabilities/malware that are known to bypass all the selected security countermeasure products.

Figure 8:
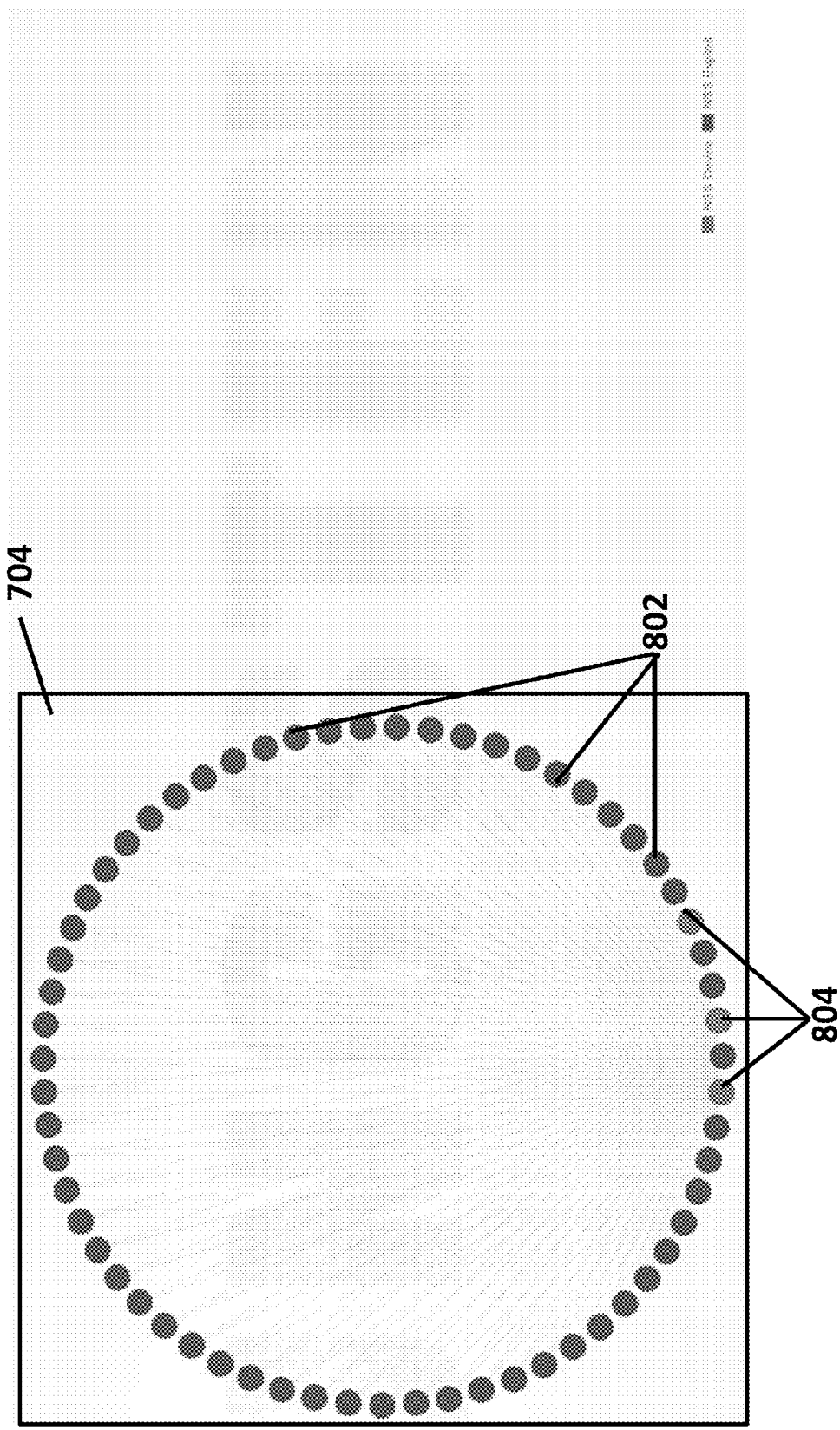
FIG. 8 is an illustration of the inner circle from FIG. 7.

By changing the display of the model exploits that bypass only one of the security devices become outliers, while those that bypass all the products modeled are moved to an inner group 704 which can be isolated as shown in FIG. 8. This shows the blue spheres 802 (most of the colored circuits shown in FIG. 8) that represent the exploits/vulnerabilities/malware, and the purple spheres 804 that represent the three security countermeasure products selected in FIG. 6. In this diagram in FIG. 8, the interconnecting lines in the model indicate the connectivity between the exploits/vulnerabilities/malware and the products being evaluated. The exploits shown in FIG. 8 are of the highest concern as they would go unstopped through all deployed security countermeasures. The model may then be used in various different ways. For example, the model may be used to identify the targeted applications or operating systems for each of these exploits. By adding "weight" to the "Application/OS" objects the applications and operating systems that are most targeted by these exploits will be displayed as larger spheres than those with fewer exploits targeting them. This is one method of triage. Other relevant data can be displayed and measured in the same way. The weight may be added due to the number of parent object in relationship to each child object. In this example, the Application/OS objects are the children and the parents are the exploits. As an Application or OS object has more exploits associated to it, it grows (graphically speaking) on the screen.

Figure 9:
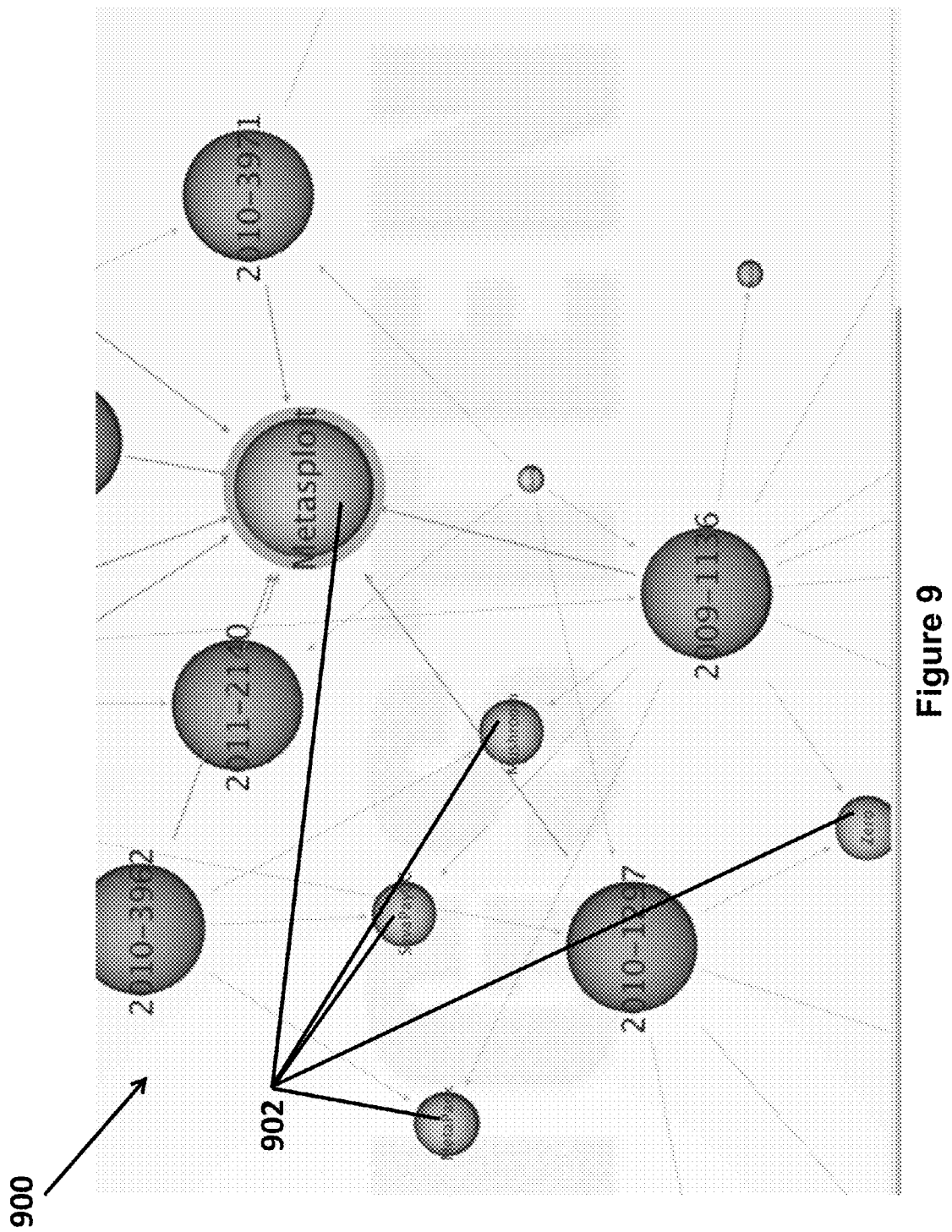
FIG. 9 is an illustration of an example of an output from a model produced by the system.

FIG. 9 is an illustration of an example of an output 900 from a model produced by the system that shows which crimeware/security testing tools contain automated versions of the exploits/vulnerabilities/malware discovered to bypass the selected security countermeasure products. In this user interface, the crimeware and security testing tools are represented by gold colored spheres 902. The larger the sphere 902, the more exploits/vulnerabilities/malware it contains that are known to bypass the selected security countermeasure products. Most notably, the exploits can be tracked to crimeware and security-testing tools to determine which of the exploits are fully automated. The full automation of an exploit broadens the scope of potential attackers, placing the full attack capability in the hands of countless low-skilled computer users rather than restricting their use to capable hackers.

Figure 10:
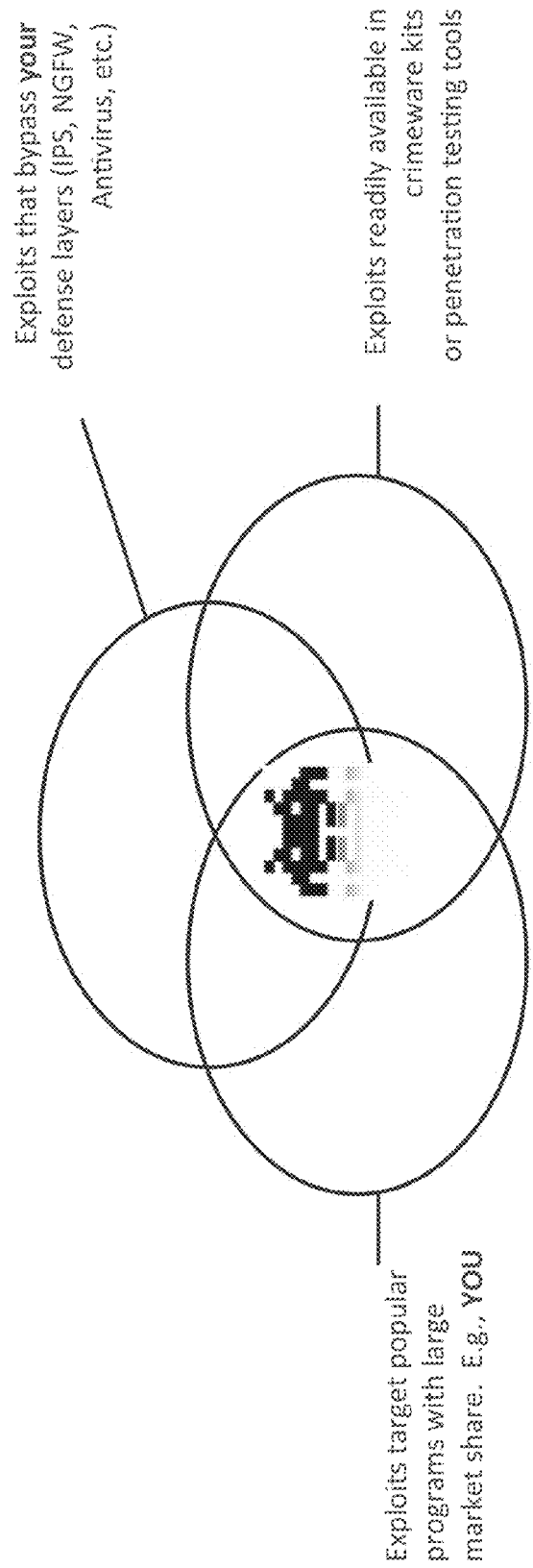
FIG. 10 is a Venn Diagram that illustrates a new model for businesses to use to determine which insecurities exist, and therefore how they should triage and mitigate risk to their critical infrastructure and intellectual property.

FIG. 10 is a Venn Diagram that illustrates a new model for businesses to use to determine which insecurities exist, and therefore how they should triage and mitigate risk to their critical infrastructure and intellectual property. With this new methodology, one understands: which exploits bypass specific defensive layers; which of these exploits target applications or operating systems; and which of those are completely automated (thus reducing the required technical know-how of the attacker, and increasing the viability of such an attack.) The data found in the overlap of the Venn sets the proper priority and focus points as it represents the reality of the situation. This provides understanding of that which bypasses defenses, targets the programs and operating systems that are being used, and which is readily available within crimeware kits and penetration/security testing tools. This is a delta from current strategies that are all predicated upon the fact that the security defense technologies work as advertised.

Figure 11:
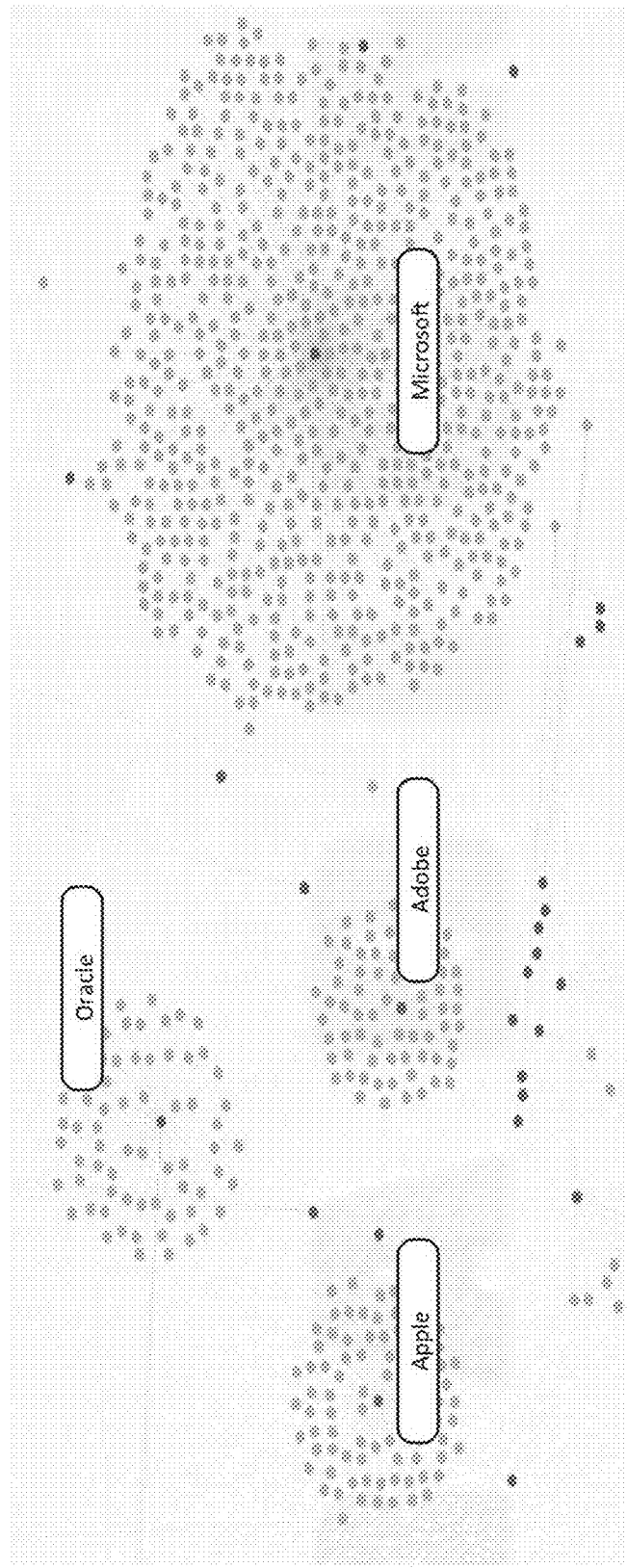
FIG. 11 is an illustration of exploits/vulnerabilities/malware known to bypass at least one selected security countermeasure product.

FIG. 11 is an illustration of exploits/vulnerabilities/malware known to bypass at least one selected security countermeasure product. In this example, the exploits/vulnerabilities/malware known to bypass at least one selected security countermeasure product are sorted by the software vendors which build the products they target. This type of modeling is critical in understanding where overall, or gross, attack vectors may be present.

The model can be modified to supply additional information, such as risk scores of known exploits (for example: CVSS numerical representations for CVE exploits.), remediation information if available, which applications and/or operating systems are targeted/affected by the exploit, etc. Disparate databases can be conjoined through the system allowing new transforms to be developed or other $3^{rd}$ party tools to integrate with the modeling. For instance, a penetration-testing tool can be used to fingerprint online security devices. Cross-referencing those fingerprints with the invention can result in the identification of the devices, in addition to all of the known exploits that will successfully bypass those devices. This changes the system from a modeling tool to an active attack tool.

FIG. 12 provides sample output from the reporting transform which summarizes the above information. In the example in FIG. 12, a sample report output is provided for CVE-2010-1297. The CVSS score, 9.30 out of 10.0, is presented along with the attack vector and targeted application (Adobe Flash Player and Acrobat.) The "Undetected by" section of the output lists all security devices and technologies tested that are known to fail to identify and therefor block this exploit. Crimeware Testtool provides a list of crimeware and test tools that contain this automated exploit. A user of the system now knowns that this exploit will bypass each of the systems listed, will work against the specific application, is extremely critical to security, is an attack that an end-user is tricked into executing themselves (target-initiated), and can be carried out easily with minimal technical skills by anyone using any of the mentioned kits.

Figure 14:
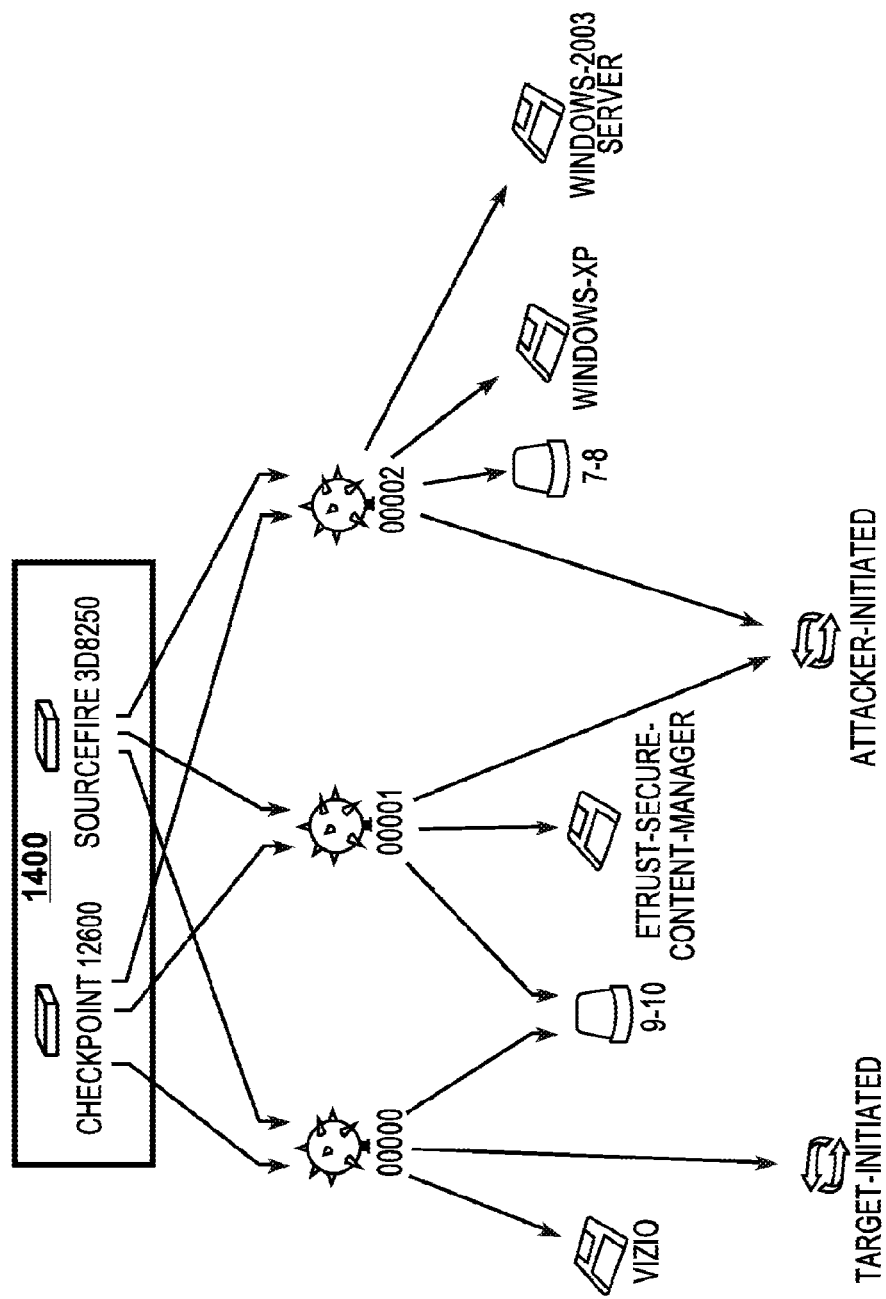
FIG. 14 illustrates a first example of the threat modeling provided using the system.

The above described system and method may be used to perform different types of threat modeling as illustrated in the examples below. The first example (an example of the user interface of which is illustrated in FIG. 14) is a model demonstrating the security efficacy of hardware and software within a layered security model as used by a company. The purpose of this model is to understand what exploits can bypass the layered security, allowing the company to understand the current unknown security vulnerabilities. This may allow the company change process end procedure to mitigate the security vulnerabilities, or they can use this model to substitute one vendor or product for another to understand the delta in overall security posture. E.g., what is the return on investment when considering the end security posture of the layered security network.

FIG. 14 illustrates the first example of the threat modeling provided using the system that shows a user interface for a corporation that uses both a Check Point 12600 and a Sourcefire 3D8250 device 1400 within their network security layers wherein the modeling is being used defensively by the corporation. These two products have three exploits (enumerated as 00000, 00001, and 00002 in FIG. 14.) Normally these exploits would display the Common Vulnerability and Exposures (CVE) assigned numbers, but for security purposes they have been masked. All other exploits have been removed from the display as they only apply to one or the other network security devices. This model is being used to determine what exploits would get past both devices and thus would affect the workstations and servers.

The corporation reviewing this information can continue to triage/set priority with regard to the other data elements that have been produced by the transforms. First, they are able to review the operating systems and applications that are vulnerable to the exploits. Exploits that target software that is not used within the corporate infrastructure can be ignored. Those that do represent software used within the corporate infrastructure can be prioritized by risk using the Common Vulnerability Scoring System (CVSS) scores. This is represented by the red alert lights and with the scoring range below them. Further transforms can be used to continue the triage process. In the provided example the attack vector has been displayed, but other transforms such as providing any sources of crimeware kits where the corporation can isolate those exploits that are of a high risk, target their applications and operating systems, which bypass their security investments and are fully automated within easy to acquire attack tools may determine the highest priority for triage and remediation within the organization.

Figure 15:
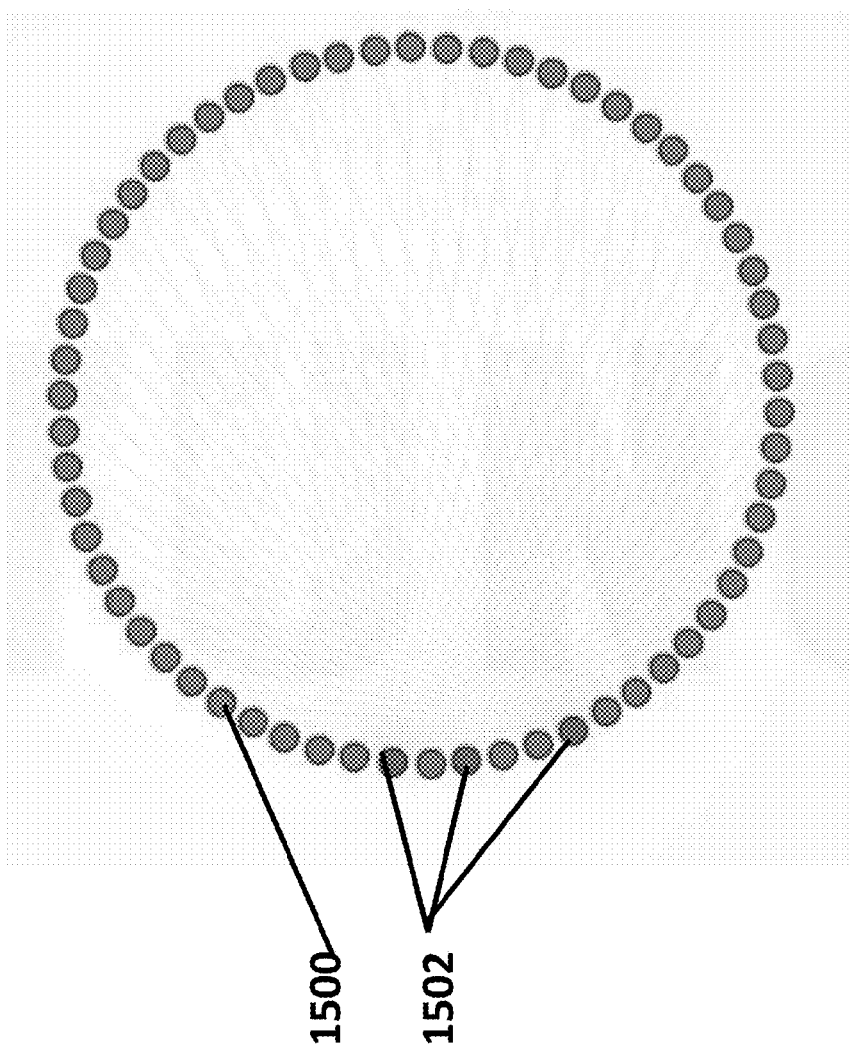
FIGS. 15-17 illustrates another example of the threat modeling provided using the system.
Figure 16:
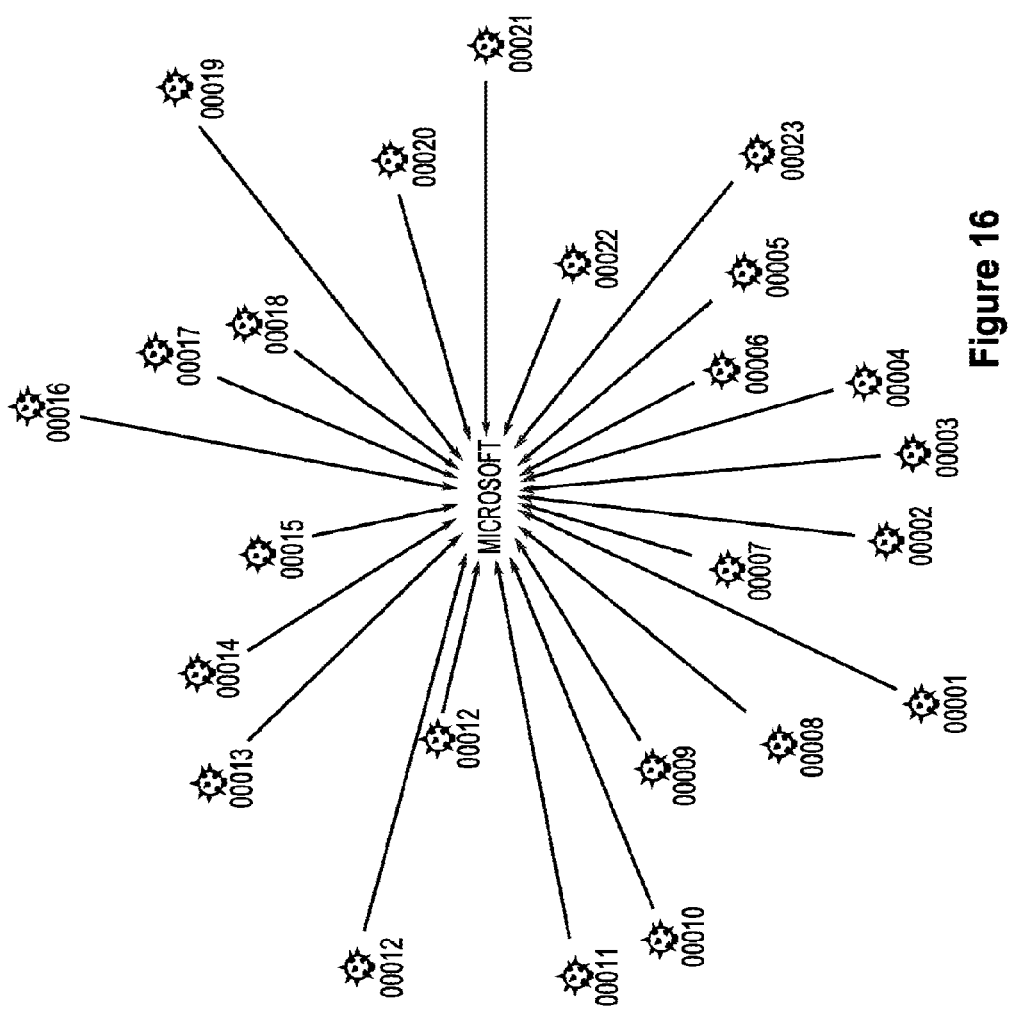
Figure 17:
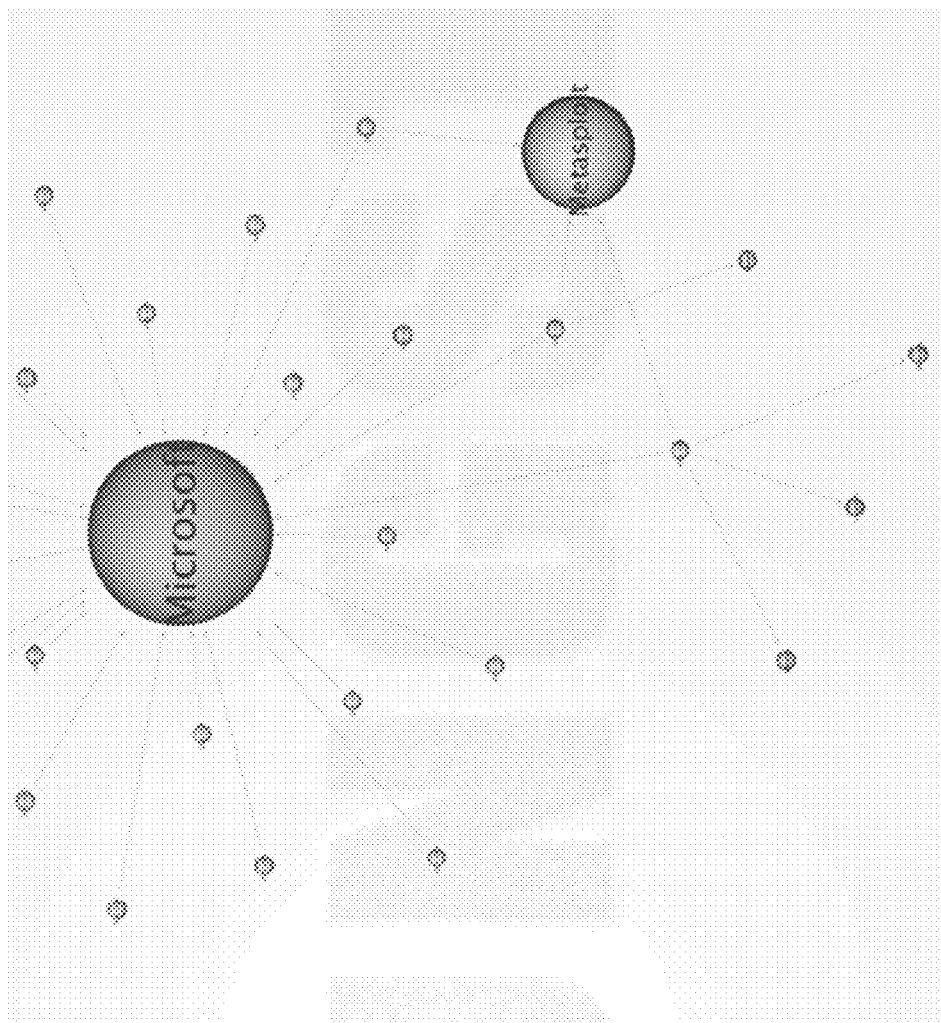

The second example of the modeling (an example of the user interface of which is shown in FIGS. 15-17) follows the path of the first, but represents a target network that an attacker may wish to bypass. Products have been placed into the model, and are generally identified either through scanning and fingerprinting a network or via social engineering. A final transform is performed to find the "sources" known exploits that bypass all layers of the security. This is done by querying a database that contains the exploit IDs and which crimeware/security testing software currently contain the attack and exploit needed. Using common attack software such as this will help an attack obfuscate themselves as these tools are available to the general public and are used quite regularly. E.g., these would not be custom attacks that may indicate a particular threat actor. The use of modeling in this case takes only several seconds to perform. The same work, when done by hand, yields only one or two possible attack vectors and may take several months to develop. The Threat Modeling invention is scalable, fast, and accurate. Manual testing is neither scalable nor fast, and may hamper the progress of cyber warfare or other offensive activities.

FIGS. 15-17 illustrates another example of the threat modeling provided using the system being used offensively by an attacker. In this model three products, two network and one endpoint software, have been modeled to represent the layered security of a target. A Palo Alto PA5020 has been combined with a Juniper SRX3600 on the network, and Symantec's enterprise endpoint protection product is running on the workstations. The attacker's purpose is to find exploits that can be utilized against the target in order to deploy a payload, which would allow them to exfiltration data and/or gain control over the servers and workstations.

This model example begins with the isolation of exploits that are shared (correlate) among all three modeled security technologies. Therefore we know the use of any of these exploits 1500 (gold colored dots which are all of the dots in FIG. 15 except the three green dots 1502) will bypass all three security technologies (green dots 1502) without being identified. In this case we will assume the attacker wishes to deploy a payload on Windows Workstations. To isolate exploits that target Microsoft products, a transform is run to link all exploits to the vendors that are effected by each exploit. By selecting "Microsoft" and including all the parent objects (exploits) these exploits can quickly be isolated as shown in FIG. 16. Again, the CVE numbers have been masked for security purposes, but the user of the system would be presented with true CVE numbers. Next the attacker will want to identify which of these exploits are currently contained within easily available crimeware and security testing tools. This will afford the attacker the ability to select an attack tool that will afford obfuscation within a few seconds.

As shown in FIG. 17, there are three exploits packaged within Metasploit, that will target Microsoft products and are fully capable of bypassing the modeled security products. The remaining purple data spheres represent four crimeware kits that have fully automated two of the identified exploits. This entire process takes several seconds to execute.

Figure 18:
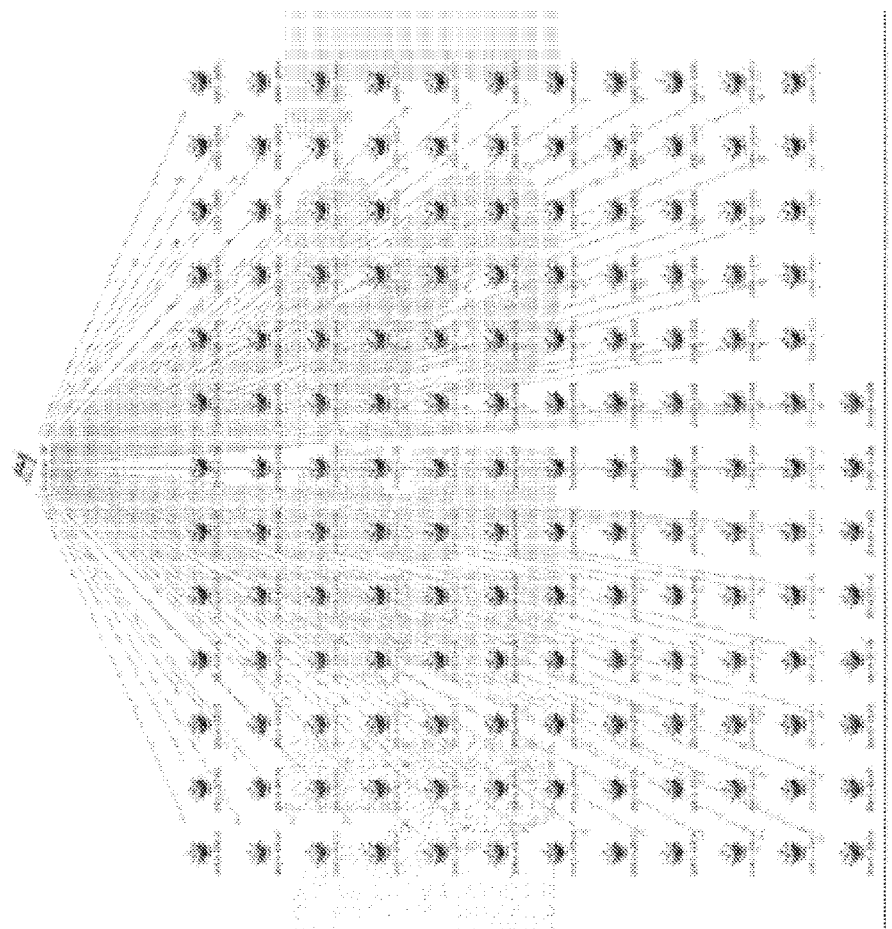
FIGS. 18-20 illustrates another example of the threat modeling provided using the system.
Figure 19:
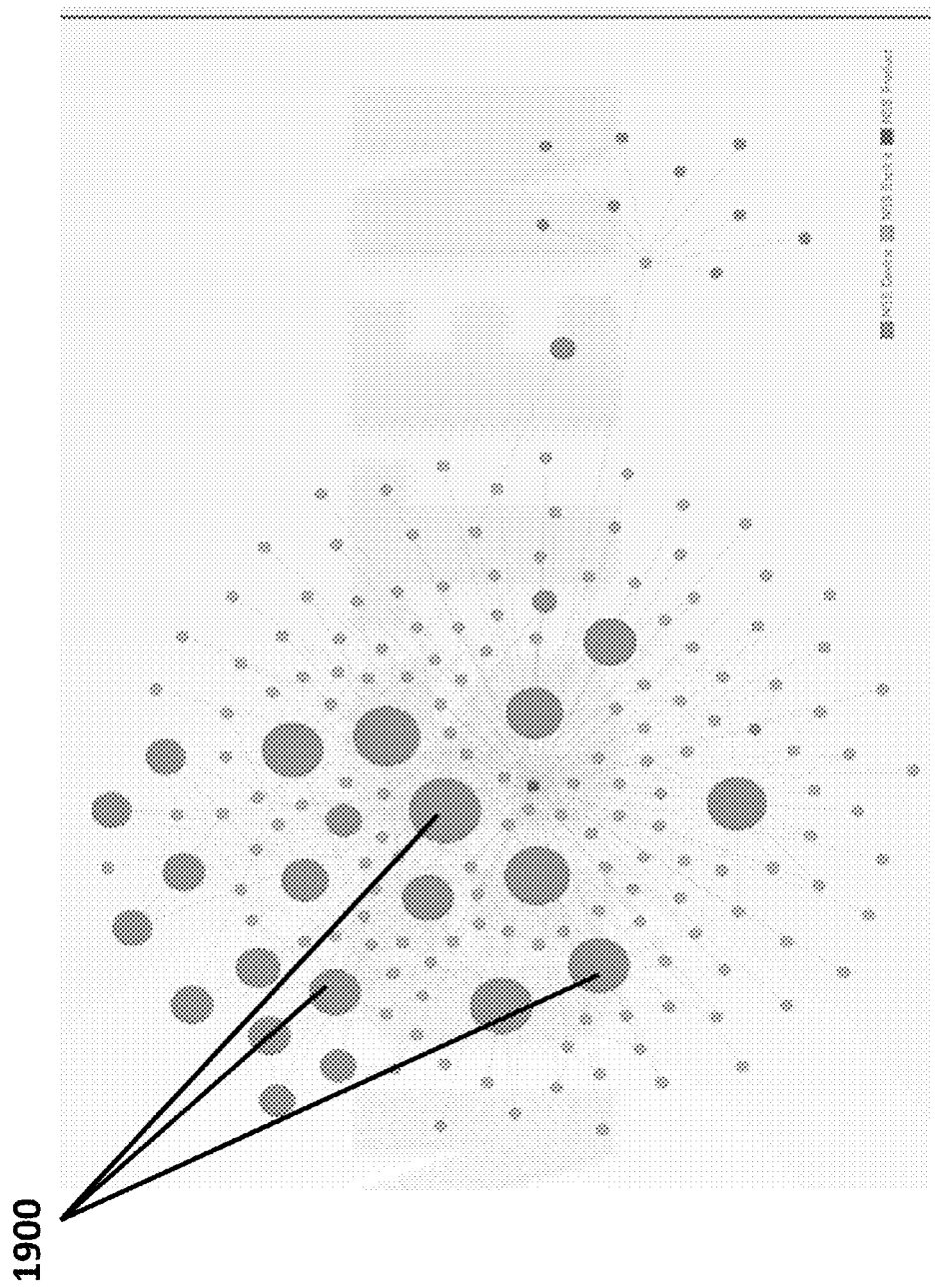
Figure 20:
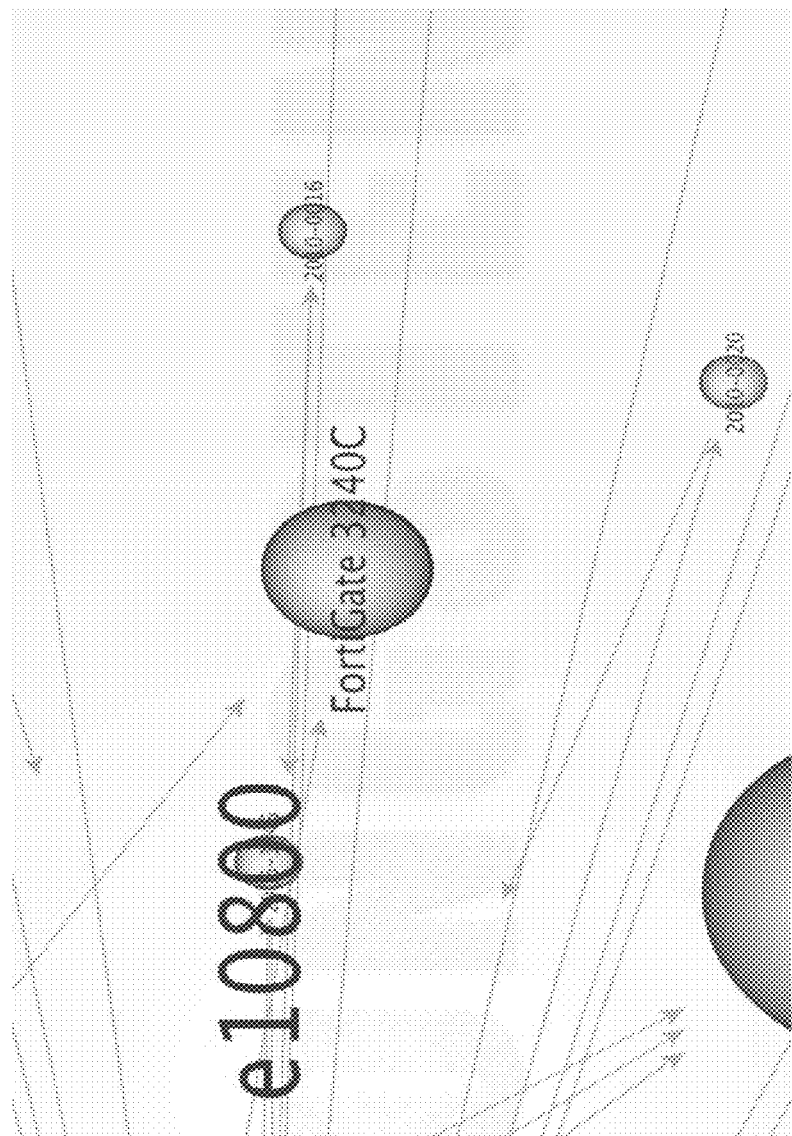

The third example of the modeling (an example of the user interface of which is shown in FIGS. 18-20) starts from the standpoint of the operating system, in this case Windows XP, that needs to be secured on a specific network. The idea is that the Windows XP machines are isolated and are used as the command and control systems for a warehouse, power plant, etc. (This is a common situation.) Normally engineers or architects would isolate these systems completely from any other network, but progress demands that such isolation is only temporary. The modeling is used to find a product best suited to protect the Windows XP systems from exploit that are known to bypass current commercial or specially developed security systems. Within seconds a consumer can isolate which products are best situated for this specific security purpose, something that is lost in all other marketing material. While this work could be conducted by hand, reviewing hundreds of pages of testing results; the Threat Modeling invention takes only seconds and indicates an optimal product/vendor that under current selection methodologies would never have been considered.

FIGS. 18-20 illustrates another example of the threat modeling provided using the system in which the user of the system is facing a very real-world problem. They have a network of Windows XP machines that manage and operate the automated systems within a factory. Normally these Windows XP machines would be completely isolated from the rest of the corporate network, and have no Internet access. But in this model, the IT group is being forced to connect these systems to the corporate network and therefore the Internet. To do this, the IT group must quickly identify a product that can sit in-line on the network between the Windows XP machines and the corporate network and have that product provide the best overall security for Windows XP workstations.

To do this, the user of the invention would start with the operating system, Windows XP, that needs to be secured. Through the exploit transform, the user of the system has the system present all exploits that are known to the invention that target Windows XP and are known to bypass at least one tested security device as shown in FIG. 18. Next, the user simply selects all the identified exploits and utilizes a transform that tracks each exploit back to all known products that fail to detect (thus protect against) the exploits. As shown in FIG. 19, a set of green spheres 1900 that have been generated are linked to the exploits that target Windows XP. The larger the sphere the more exploits that are known to bypass that particular security product. Basically, the user of the system in this model is looking for the smallest green sphere. In this particular model, FortiGate's 3240C product has the best ability (smallest number of failed detections of exploits) to protect Windows XP workstations as shown in FIG. 20. This modeling exercise would take several seconds. The user of the invention quickly identifies the product best suited to the specific engineering need. Ordinarily, the user of the system might not immediately identify the FortiGate's 3240C product, but would choose better known IBM, CheckPoint, etc. product. However, that user may not be aware that the FortiGate's 3240C product is a product designed for a smaller company and thus actually still protects Windows XP system whereas the better known systems are no longer supporting Windows XP systems. However, the modeling is able to identify this for the user.

The foregoing description, for purpose of explanation, has been described with reference to specific embodiments. However, the illustrative discussions above are not intended to be exhaustive or to limit the disclosure to the precise forms disclosed. Many modifications and variations are possible in view of the above teachings. The embodiments were chosen and described in order to best explain the principles of the disclosure and its practical applications, to thereby enable others skilled in the art to best utilize the disclosure and various embodiments with various modifications as are suited to the particular use contemplated.

The system and method described herein may be implemented via one or more components, systems, servers, appliances, other subcomponents, or distributed between such elements. When implemented as a system, such systems may include an/or involve, inter alia, components such as software modules, general-purpose CPU, RAM, etc. found in general-purpose computers. In implementations where the innovations reside on a server, such a server may include or involve components such as CPU, RAM, etc., such as those found in general-purpose computers.

Additionally, the system and method described herein may be achieved via implementations with disparate or entirely different software, hardware and/or firmware components, beyond that set forth above. With regard to such other components (e.g., software, processing components, etc.) and/or computer-readable media associated with or embodying the present disclosures, for example, aspects of the innovations herein may be implemented consistent with numerous general purpose or special purpose computing systems or configurations. Various exemplary computing systems, environments, and/or configurations that may be suitable for use with the innovations herein may include, but are not limited to: software or other components within or embodied on personal computers, servers or server computing devices such as routing/connectivity components, hand-held or laptop devices, multiprocessor systems, microprocessor-based systems, set top boxes, consumer electronic devices, network PCs, other existing computer platforms, distributed computing environments that include one or more of the above systems or devices, etc.

In some instances, aspects of the system and method described herein may be achieved via or performed by logic and/or logic instructions including program modules, executed in association with such components or circuitry, for example. In general, program modules may include routines, programs, objects, components, data structures, etc. that perform particular tasks or implement particular instructions herein. The disclosures may also be practiced in the context of distributed software, computer, or circuit settings where circuitry is connected via communication buses, circuitry or links. In distributed settings, control/instructions may occur from both local and remote computer storage media including memory storage devices.

The software, circuitry and components herein may also include and/or utilize one or more type of computer readable media. Computer readable media can be any available media that is resident on, associable with, or can be accessed by such circuits and/or computing components. By way of example, and not limitation, computer readable media may comprise computer storage media and communication media. Computer storage media includes volatile and non-volatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic tape, magnetic disk storage or other magnetic storage devices, or any other medium which can be used to store the desired information and can accessed by computing component. Communication media may comprise computer readable instructions, data structures, program modules and/or other components. Further, communication media may include wired media such as a wired network or direct-wired connection, however no media of any such type herein includes transitory media. Combinations of the any of the above are also included within the scope of computer readable media.

In the present description, the terms component, module, device, etc. may refer to any type of logical or functional software elements, circuits, blocks and/or processes that may be implemented in a variety of ways. For example, the functions of various circuits and/or blocks can be combined with one another into any other number of modules. Each module may even be implemented as a software program stored on a tangible memory (e.g., random access memory, read only memory, CD-ROM memory, hard disk drive, etc.) to be read by a central processing unit to implement the functions of the innovations herein. Or, the modules can comprise programming instructions transmitted to a general purpose computer or to processing/graphics hardware via a transmission carrier wave. Also, the modules can be implemented as hardware logic circuitry implementing the functions encompassed by the innovations herein. Finally, the modules can be implemented using special purpose instructions (SIMD instructions), field programmable logic arrays or any mix thereof which provides the desired level performance and cost.

As disclosed herein, features consistent with the present disclosures may be implemented via computer-hardware, software and/or firmware. For example, the systems and methods disclosed herein may be embodied in various forms including, for example, a data processor, such as a computer that also includes a database, digital electronic circuitry, firmware, software, or in combinations of them. Further, while some of the disclosed implementations describe specific hardware components, systems and methods consistent with the innovations herein may be implemented with any combination of hardware, software and/or firmware. Moreover, the above-noted features and other aspects and principles of the innovations herein may be implemented in various environments. Such environments and related applications may be specially constructed for performing the various routines, processes and/or operations according to the disclosure or they may include a general-purpose computer or computing platform selectively activated or reconfigured by code to provide the necessary functionality. The processes disclosed herein are not inherently related to any particular computer, network, architecture, environment, or other apparatus, and may be implemented by a suitable combination of hardware, software, and/or firmware. For example, various general-purpose machines may be used with programs written in accordance with teachings of the disclosure, or it may be more convenient to construct a specialized apparatus or system to perform the required methods and techniques.

Aspects of the method and system described herein, such as the logic, may also be implemented as functionality programmed into any of a variety of circuitry, including programmable logic devices ("PLDs"), such as field programmable gate arrays ("FPGAs"), programmable array logic ("PAL") devices, electrically programmable logic and memory devices and standard cell-based devices, as well as application specific integrated circuits. Some other possibilities for implementing aspects include: memory devices, microcontrollers with memory (such as EEPROM), embedded microprocessors, firmware, software, etc. Furthermore, aspects may be embodied in microprocessors having software-based circuit emulation, discrete logic (sequential and combinatorial), custom devices, fuzzy (neural) logic, quantum devices, and hybrids of any of the above device types. The underlying device technologies may be provided in a variety of component types, e.g., metal-oxide semiconductor field-effect transistor ("MOSFET") technologies like complementary metal-oxide semiconductor ("CMOS"), bipolar technologies like emitter-coupled logic ("ECL"), polymer technologies (e.g., silicon-conjugated polymer and metal-conjugated polymer-metal structures), mixed analog and digital, and so on.

It should also be noted that the various logic and/or functions disclosed herein may be enabled using any number of combinations of hardware, firmware, and/or as data and/or instructions embodied in various machine-readable or computer-readable media, in terms of their behavioral, register transfer, logic component, and/or other characteristics. Computer-readable media in which such formatted data and/or instructions may be embodied include, but are not limited to, non-volatile storage media in various forms (e.g., optical, magnetic or semiconductor storage media) though again does not include transitory media. Unless the context clearly requires otherwise, throughout the description, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

Although certain presently preferred implementations of the disclosure have been specifically described herein, it will be apparent to those skilled in the art to which the disclosure pertains that variations and modifications of the various implementations shown and described herein may be made without departing from the spirit and scope of the disclosure. Accordingly, it is intended that the disclosure be limited only to the extent required by the applicable rules of law.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. A method for modeling computer and network threats, comprising:
   receiving information about an entity that is to be protected from threats, the entity being one of an application and an operating system;
   receiving information about one or more security products for protecting the entity;
   modeling each security product to identify one or more exploits that are not stopped by the security product; and
   displaying a graphical output to the user that displays the one or more security products for protecting the entity and a plurality of known exploits and each exploit is linked to one or more of the security products, each security product having an icon having a size wherein the size of the icon for a particular security product grows when additional exploits are linked to the particular security product.

2. The method of claim 1, wherein modeling each security product further comprises using a transform for modeling each security product.

3. The method of claim 2, wherein using the transform for modeling each security product further comprises correlating failures of security products to stop a particular exploit.

4. The method of claim 1 further comprising indicating each security product that protects the entity against the one or more exploits.

5. The method of claim 1 further comprising indicating the one or more exploits used to threaten the entity.

6. The method of claim 1, wherein the modeling models one of attacker initiated attacks and target initiated attacks.

7. The method of claim 1 further comprising generating correlated failures in the one or more security products to detect an exploit that is not stopped by the one or more security products.

8. The method of claim 1 further comprising indicating if the one or more exploits are in a crimeware kit.

9. The method of claim 1 further comprising generating a common vulnerabilities and exposures (CVE) data for each exploit.

10. The method of claim 9 further comprising displaying the security products known to fail to detect an exploit with the CVE data.

11. The method of claim 1 further comprising using the modeling as one of an offensive tool and a defensive tool.

12. The method of claim 11, wherein using the modeling as an offensive tool further comprises identifying one or more tools that bypass the one or more security products.

13. An apparatus for modeling computer and network threats, comprising:
   a computer system having a processor and a memory;
   a threat modeling component executed by the processor;
   the processor configured to receive information about an entity that is to be protected from threats, the entity being one of an application and an operating system and to receive information about one or more security products for protecting the entity;
   the processor configured to model each security product to identify one or more exploits that are not stopped by the security product; and
   the processor configured to display a graphical output to the user that displays the one or more security products for protecting the entity and a plurality of known exploits and each exploit is linked to one or more of the security products, each security product having an icon having a size wherein the size of the icon for a particular security product grows when additional exploits are linked to the particular security product.

14. The apparatus of claim 13, wherein the processor configured to model each security product further comprises the processor configured to use a transform for modeling each security product.

15. The apparatus of claim 14, wherein processor configured to use the transform further comprises the processor configured to correlate failures of security products to stop a particular exploit.

16. The apparatus of claim 13, wherein the processor is configured to indicate each security product that protects the entity against the one or more exploits.

17. The apparatus of claim 13, wherein the processor is configured to indicate the one or more exploits used to threaten the entity.

18. The apparatus of claim 13, wherein the processor is configured to generate correlated failures in the one or more security products to detect an exploit that is not stopped by the one or more security products.

19. The apparatus of claim 13, wherein the processor is configured to indicate if the one or more exploits are in a crimeware kit.

20. The apparatus of claim 13, wherein the processor is configured to generate a common vulnerabilities and exposures (CVE) data for each exploit.

21. The apparatus of claim 20, wherein the processor is configured to display the security products known to fail to detect an exploit with the CVE data.

22. The apparatus of claim 13, wherein the processor is configured to be used as one of an offensive tool and a defensive tool.

23. The apparatus of claim 22, wherein the processor is configured to identify one or more tools that bypass the one or more security products when used as the offensive tool.

24. The apparatus of claim 13, wherein the threat modeling component is remote from the entity being protected.

25. The apparatus of claim 13, wherein the threat modeling component is embedded in a network to which the entity to be protected is connected.

* * * * *